April 15, 1952     E. VAN DER PYL     2,592,768
AUTOMATIC MOLDING PRESS

Filed May 29, 1948     16 Sheets-Sheet 1

Inventor
EDWARD VAN DER PYL
By [signature] Attorney

April 15, 1952

E. VAN DER PYL 2,592,768

AUTOMATIC MOLDING PRESS

Filed May 29, 1948

Inventor
EDWARD VAN DER PYL
By George Crompton Attorney

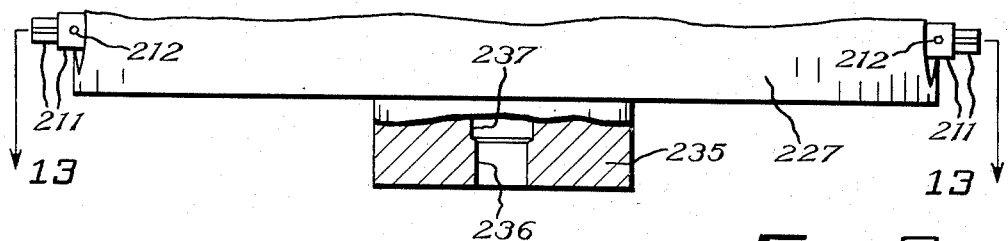
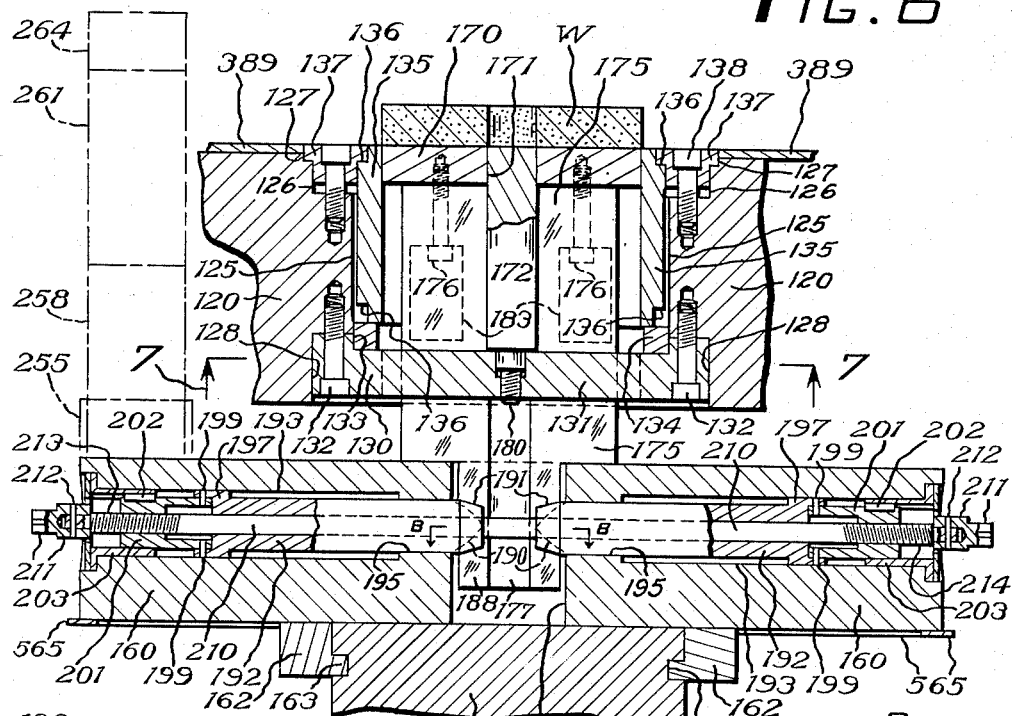
Inventor
EDWARD VAN DER PYL

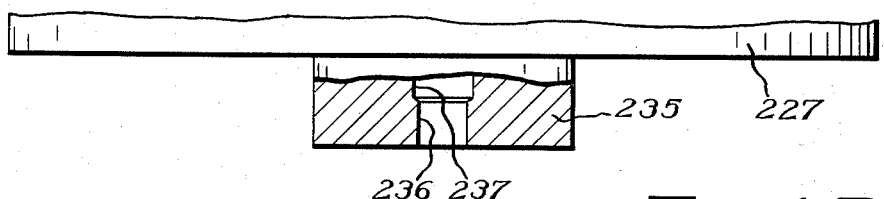
FIG. 10
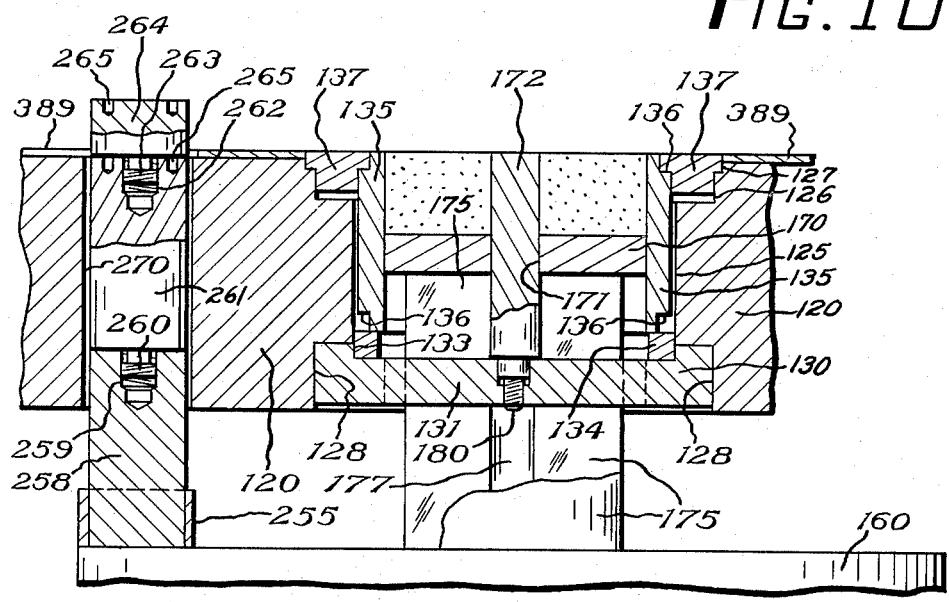
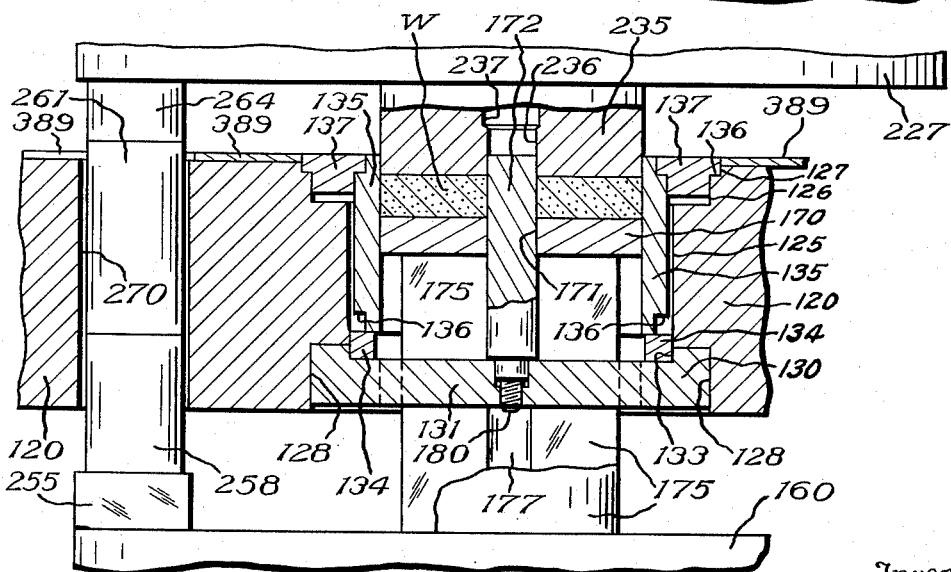
FIG. 11

April 15, 1952     E. VAN DER PYL     2,592,768
AUTOMATIC MOLDING PRESS

Filed May 29, 1948     16 Sheets-Sheet 6

Inventor
EDWARD VAN DER PYL
By George Crompton Attorney

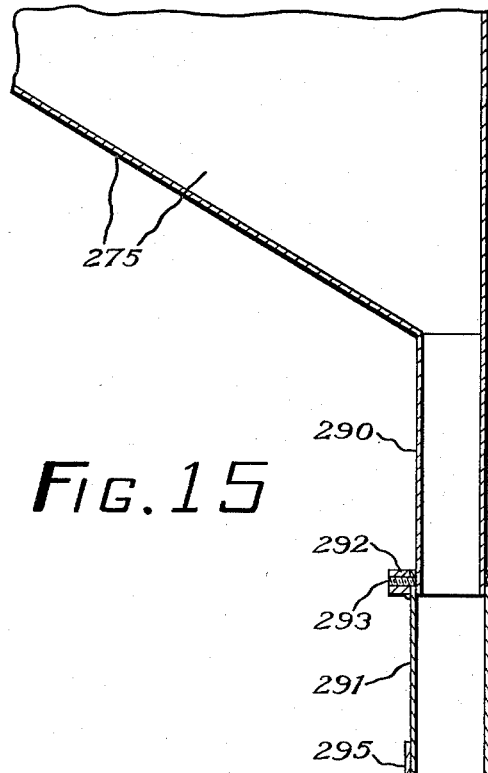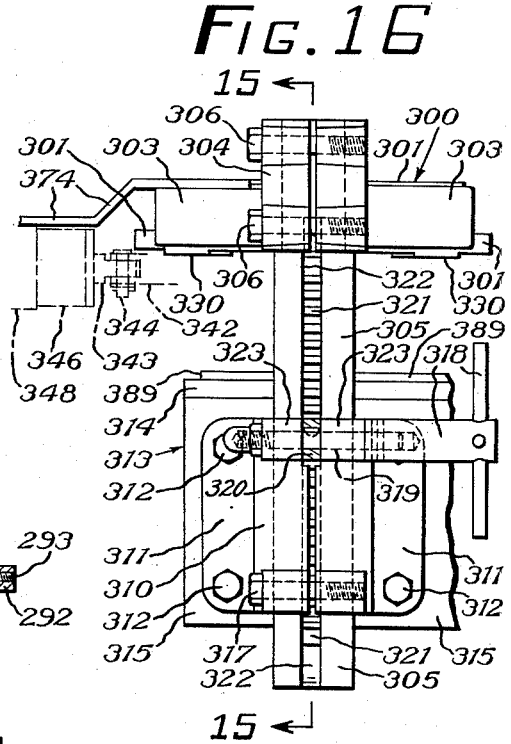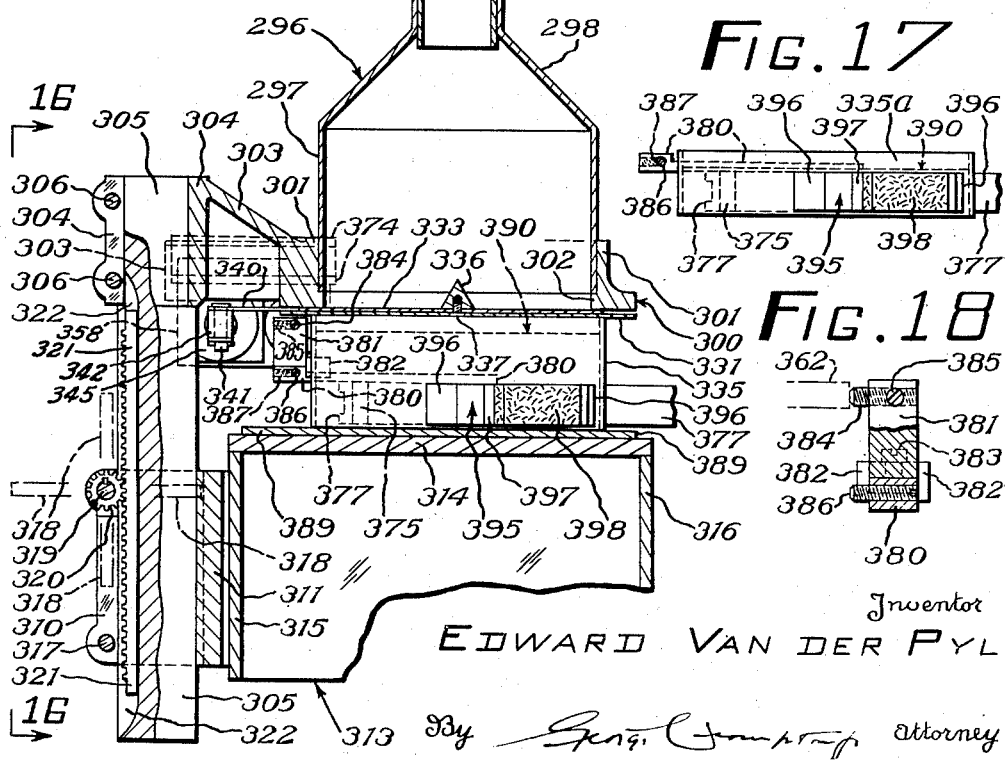

April 15, 1952 E. VAN DER PYL 2,592,768
AUTOMATIC MOLDING PRESS
Filed May 29, 1948 16 Sheets-Sheet 8
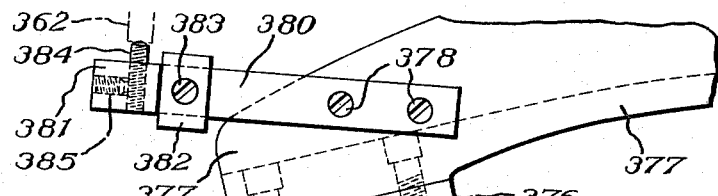
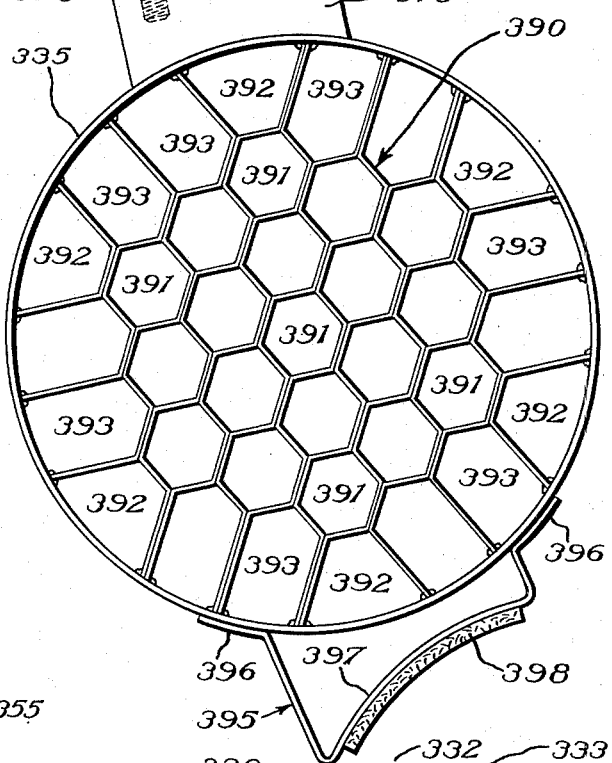
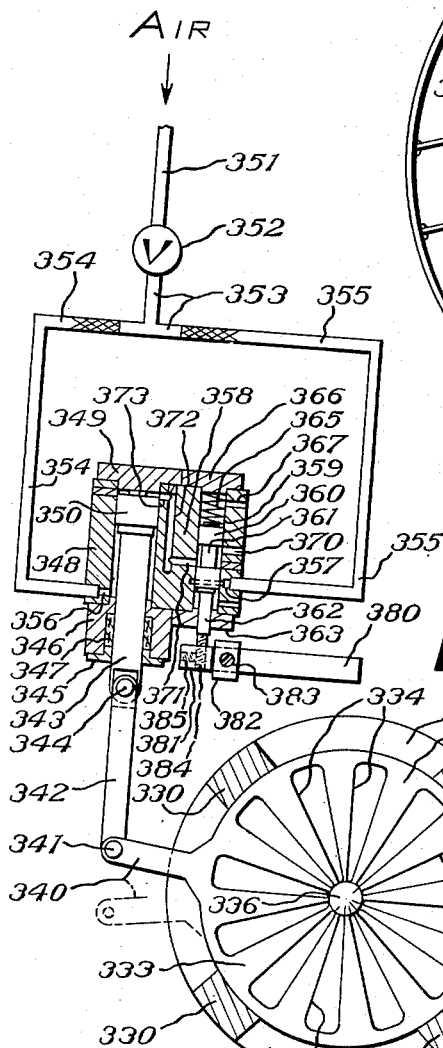
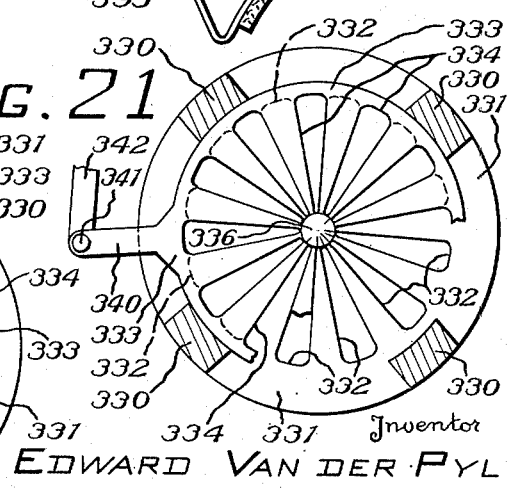
Inventor
EDWARD VAN DER PYL April 15, 1952   E. VAN DER PYL   2,592,768
AUTOMATIC MOLDING PRESS
Filed May 29, 1948   16 Sheets-Sheet 9

Inventor
EDWARD VAN DER PYL
By George Crompton   Attorney

April 15, 1952  E. VAN DER PYL  2,592,768
AUTOMATIC MOLDING PRESS
Filed May 29, 1948  16 Sheets-Sheet 10

Inventor
EDWARD VAN DER PYL
By George Crompton Jr. Attorney

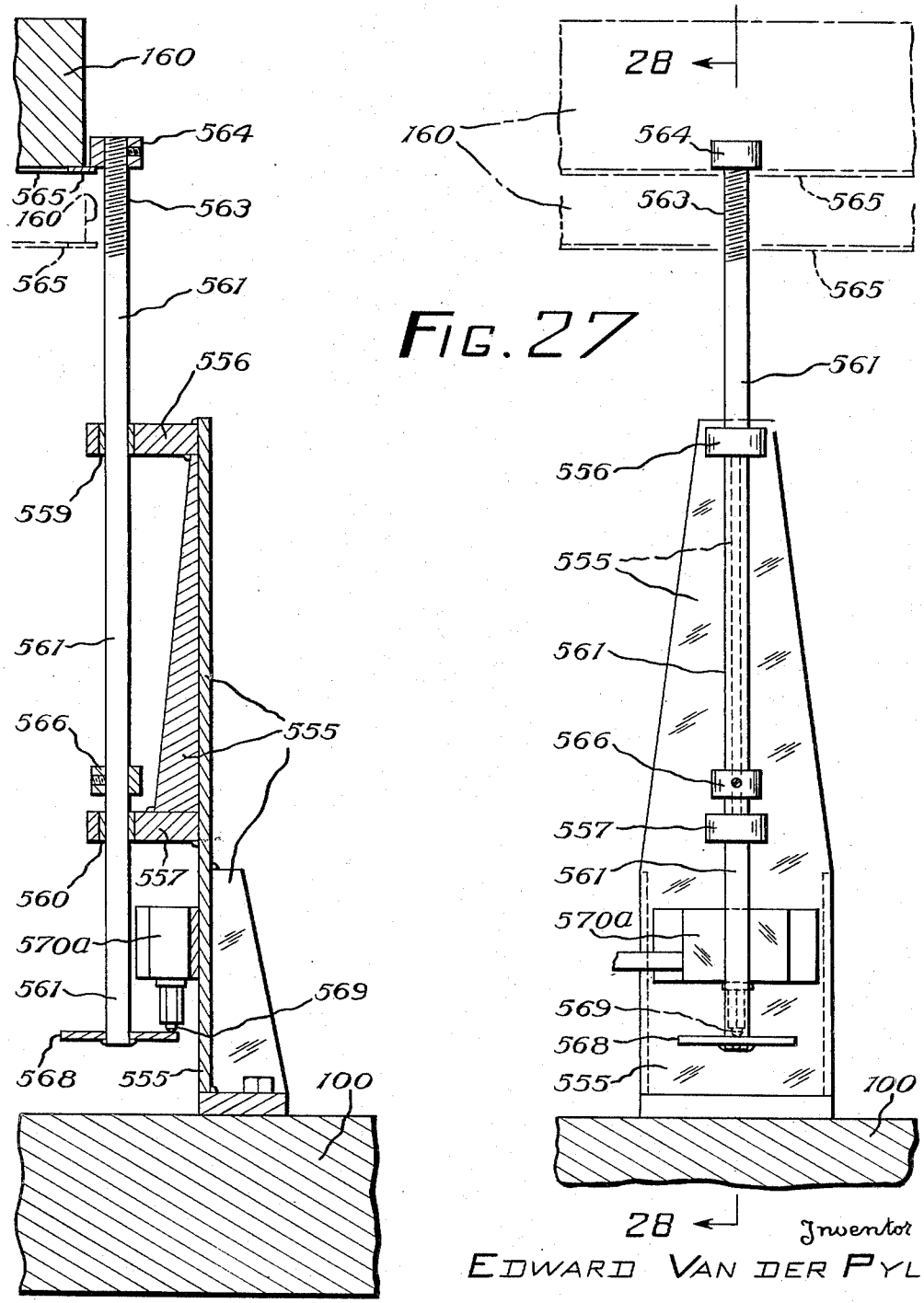

April 15, 1952     E. VAN DER PYL     2,592,768
AUTOMATIC MOLDING PRESS
Filed May 29, 1948     16 Sheets-Sheet 13

Inventor
EDWARD VAN DER PYL
By    Attorney

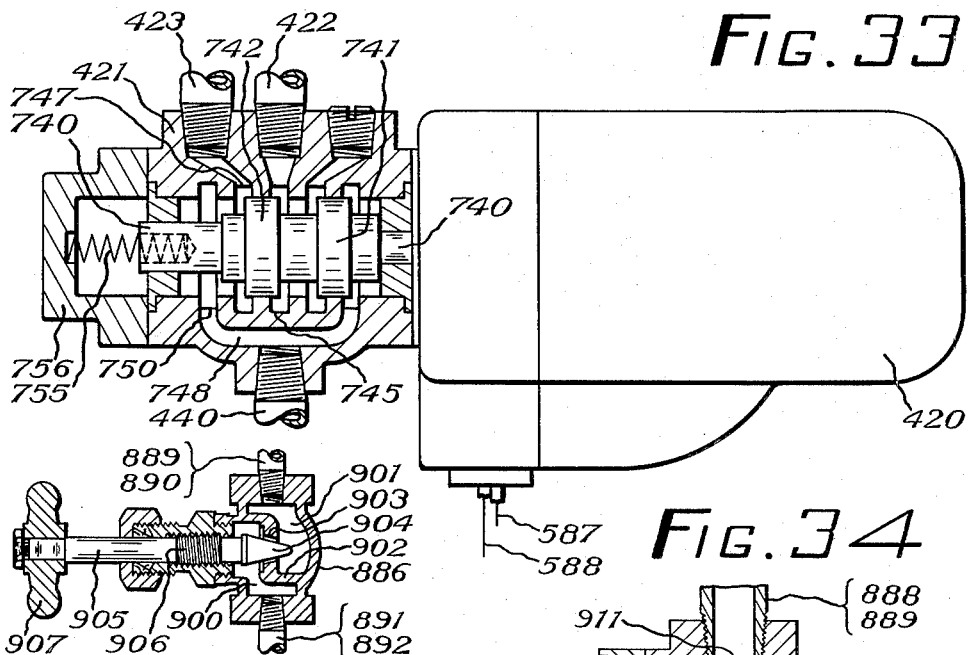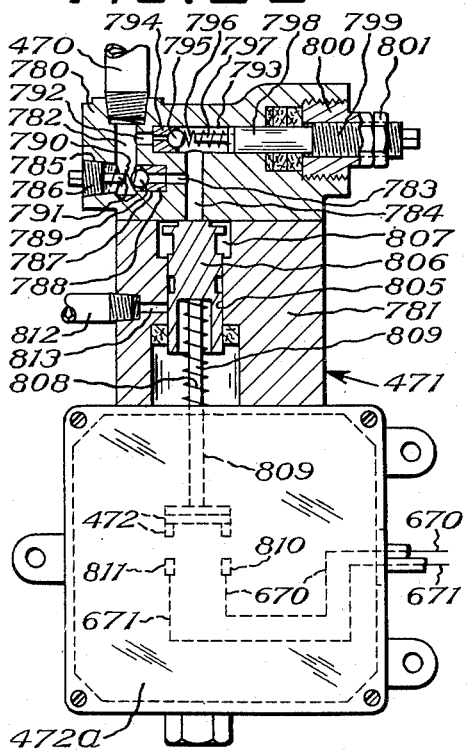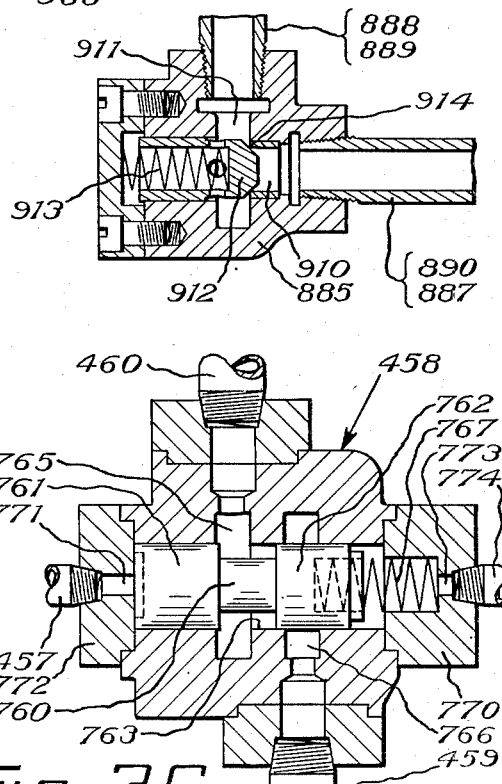

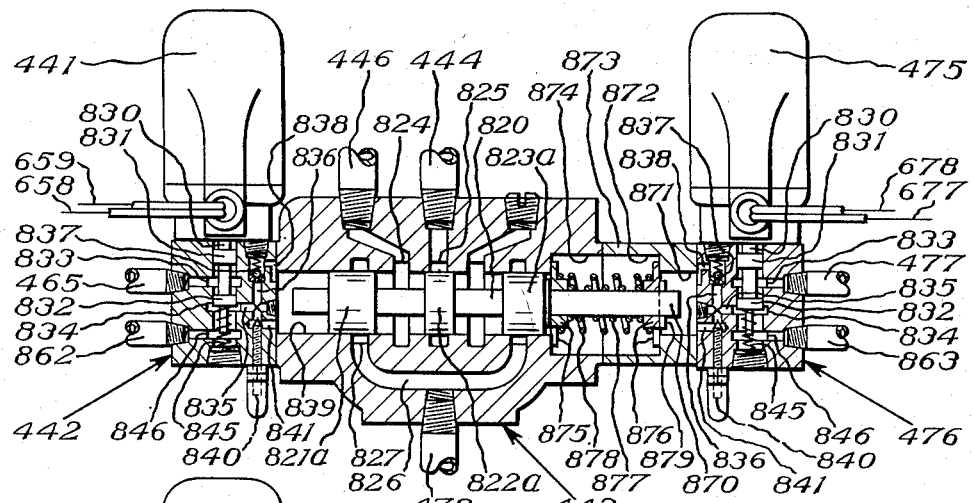
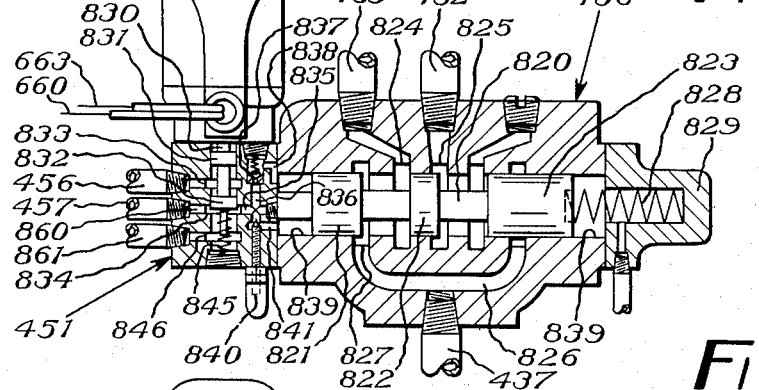
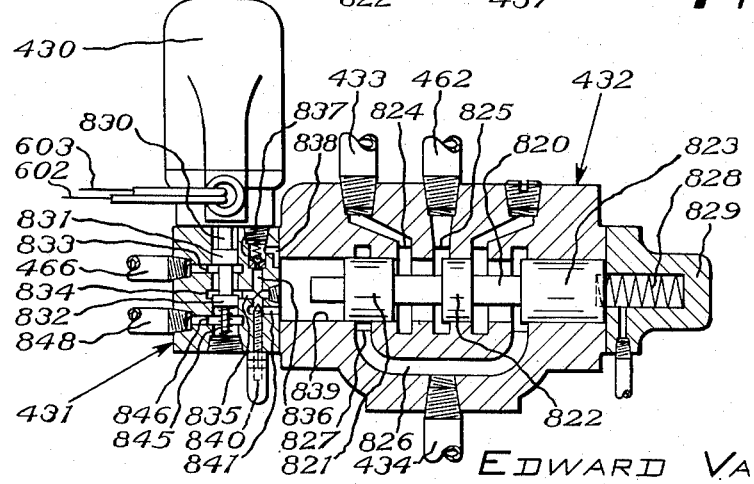

April 15, 1952     E. VAN DER PYL     2,592,768
AUTOMATIC MOLDING PRESS
Filed May 29, 1948     16 Sheets-Sheet 16
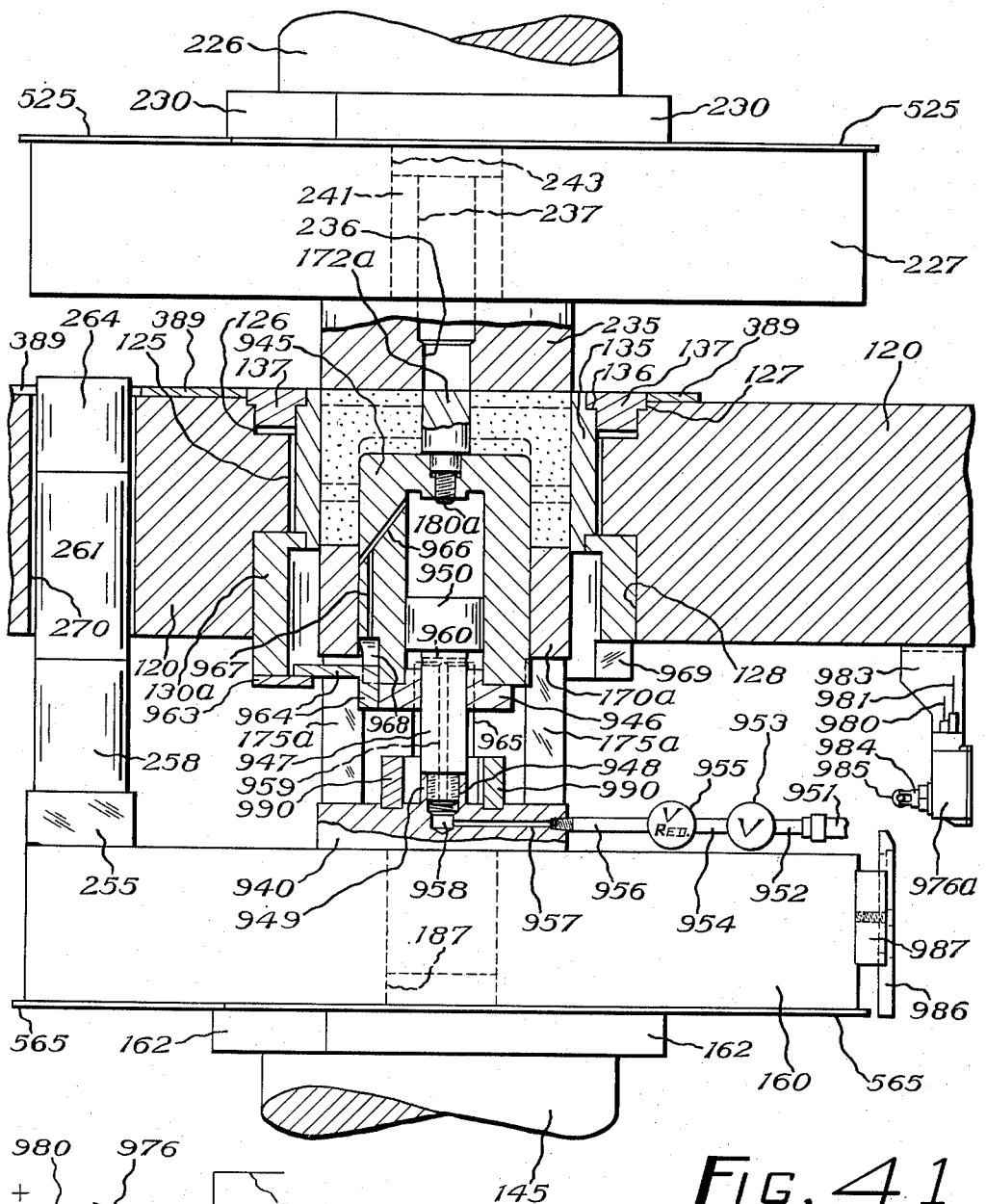
FIG. 41
FIG. 42
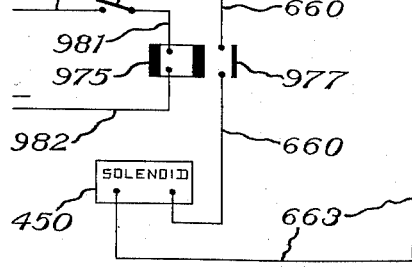
Inventor
EDWARD VAN DER PYL
By George Crompton, Attorney Patented Apr. 15, 1952

2,592,768

UNITED STATES PATENT OFFICE 2,592,768

AUTOMATIC MOLDING PRESS

Edward Van der Pyl, Holden, Mass., assignor to Norton Company, Worcester, Mass., a corporation of Massachusetts Application May 29, 1948, Serial No. 30,174

14 Claims. (Cl. 18—16)

The invention relates to automatic molding presses particularly for the molding of grinding wheels especially, medium or large sizes of grinding wheels.

One object of the invention is to provide an automatic molding press which is highly efficient for the molding of bodies in the shape of grinding wheels from the mixture of abrasive and vitrifiable bond. Another object of the invention is to mold grinding wheels to substantially uniform density, top and bottom. Another object of the invention is to provide apparatus of the type indicated with top and bottom rams and hydraulic control for moving the rams at first under low pressure and finally under very high pressure. Another object of the invention is to provide, in a molding press, hydraulic apparatus whereby the mixture being molded is pressed at first under low pressure and whenever the mixture offers a certain amount of resistance, the pressure automatically increases. Another object of the invention is to provide a molding press having the characteristics indicated in the preceding object with top and bottom rams. Another object of the invention is to provide a molding press of the type indicated which can be readily changed to mold grinding wheels of different sizes. Another object of the invention is to provide a heavy duty press with top and bottom rams and hydraulic controls and system whereby the fluid to operate one ram is pumped by the other rams thus keeping the rams in step, which construction and mode of operation makes it possible to produce grinding wheels of uniform density molded to close tolerances. Another object of the invention is to provide a molding press of the character indicated with transfer mechanism in the form of a hopper and a charging box which moves to and fro to carry the mixture of abrasive and bond from the storage hopper to the molding station, the transfer being synchronized with the molding automatically and continuously to produce molded or "green" grinding wheels one after the other so long as the apparatus is in operation and the hopper is supplied with material.

Other objects will be in part obvious or in part pointed out hereinafter.

In the accompanying drawings in which is shown one of various possible embodiments of the mechanical features of this invention:

Figure 6 is a vertical axial fragmentary sectional view on an enlarged scale taken along the line 6—6 of Figure 4 and showing the mold parts, the rams and associated mechanism, the upper ram head being shown in elevation.

Figure 7 is a sectional view taken along the line 7—7 of Figure 6.

Figure 8 is a sectional view taken along the line 8—8 of Figure 6.

Figuer 9 is a sectional view taken along the line 9—9 of Figure 8.

Figures 10 and 11 are views similar to Figure 6 showing different stages of the operation of pressing a grinding wheel, Figure 10 illustrating the parts just after the mold has been filled, and Figure 11 illustrating the parts at the moment when the mold is completely closed and the grinding wheel has just been pressed.

Figure 12:
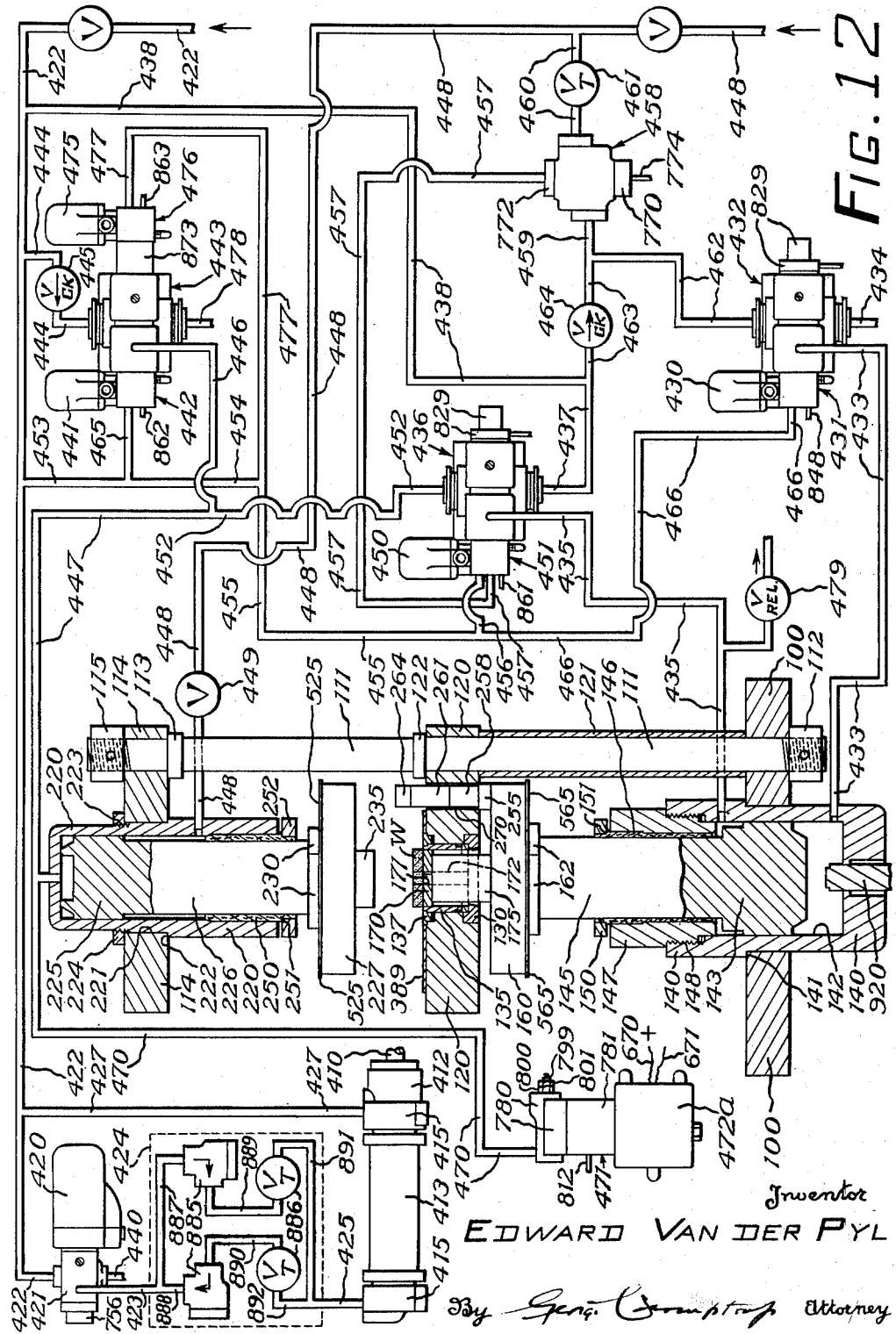

Figure 12 is a vertical axial sectional view of the entire press and mold mechanism together with a fluid pressure diagram.

Figure 13:
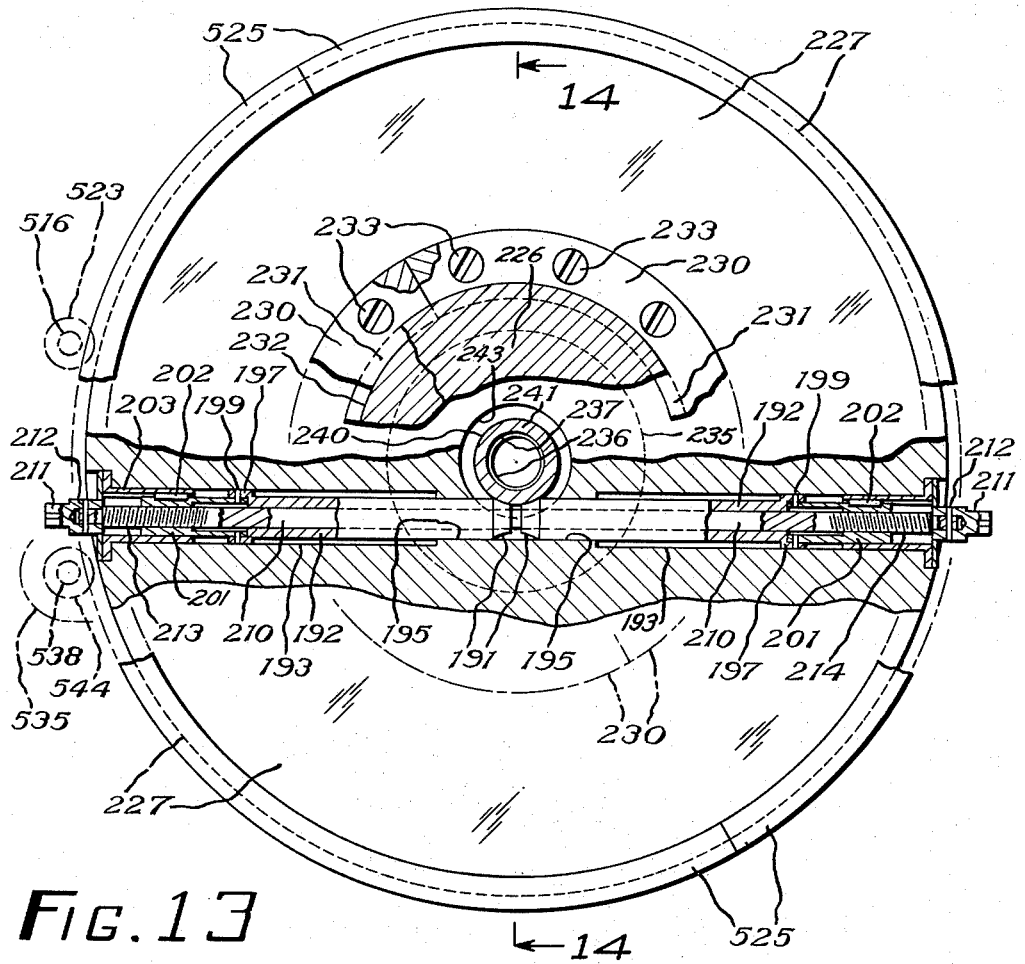

Figure 13 is a view of the upper ram head partly in plan and partly in section along the line 13—13 of Figure 6.

Figure 14:
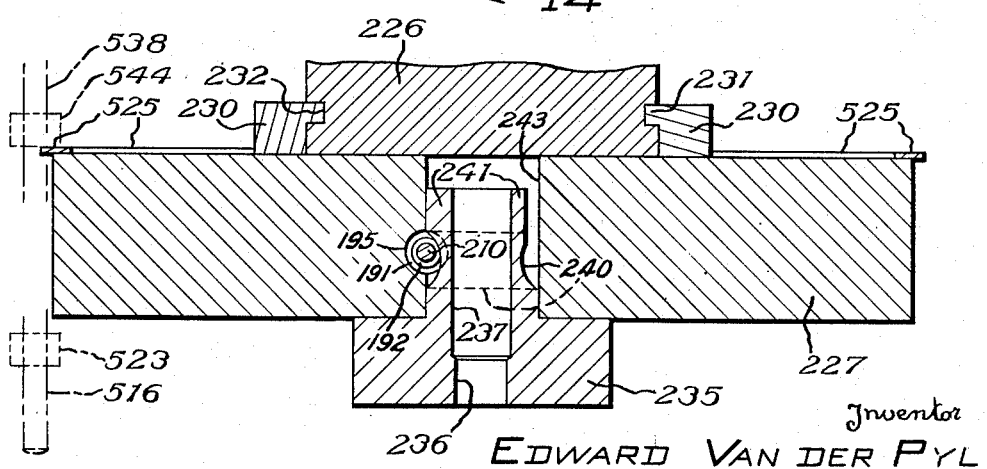

Figure 14 is a sectional view taken on the line 14—14 of Figure 13.

Figure 15 is a vertical sectional view of the hopper and the charging mechanism to fill the charging box which fills the mold.

Figure 16 is an elevation of adjustment mechanism to adjust the charging mechanism for different sizes of charging boxes, the view being taken from the line 16—16 of Figure 15.

Figure 17 is an elevation of a smaller size of charging box to replace the charging box shown in Figure 15.

Figure 18 is a view partly in elevation and partly in section of an operating device to actuate the pneumatic mechanism that operates the register to deposit a charge in the charging box.

Figure 19 is a plan view of the charging box and certain parts connected thereto.

Figure 20 is a sectional view of a pneumatically operated piston and cylinder unit together with the valve and the piping therefor, and shows also the register for delivering a charge of material to the charging box, the register being in open position.

Figure 21 is a view of the register in closed position.

Figure 4:
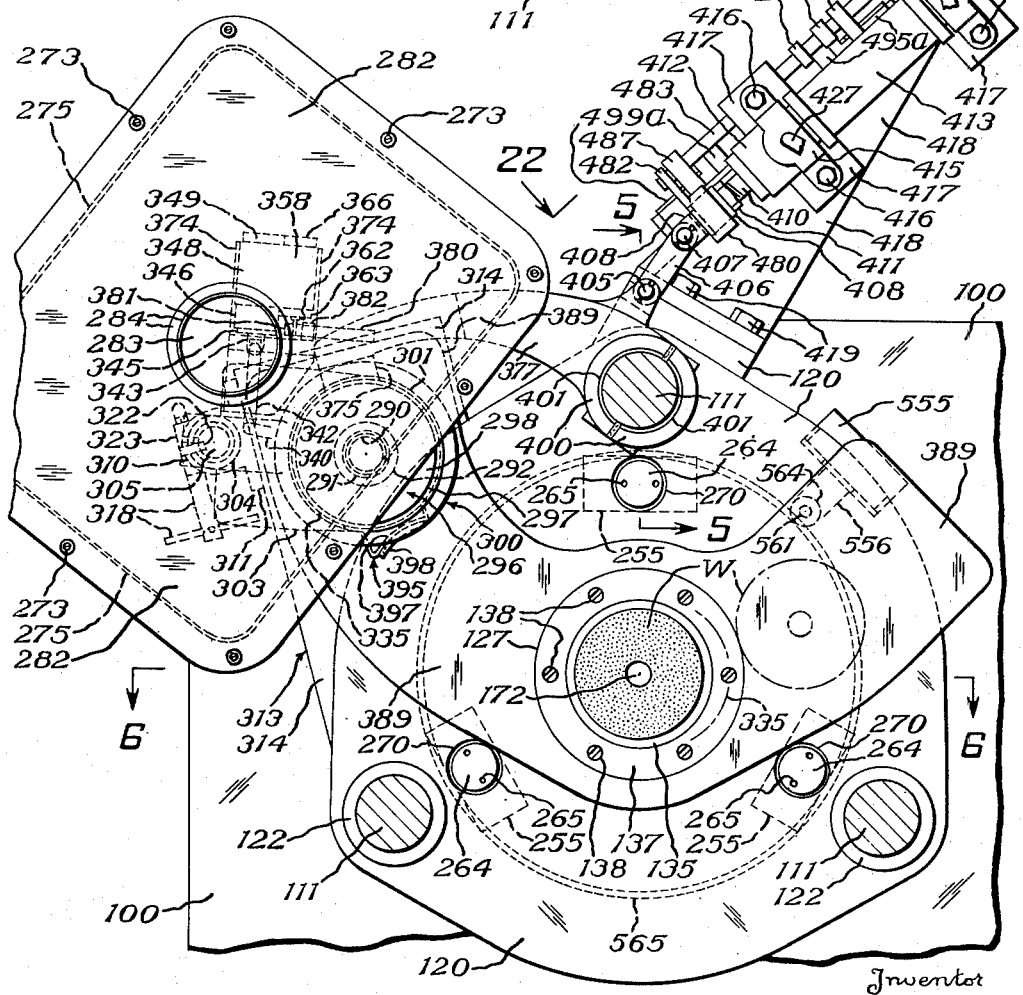
Figure 4 is a plan view showing the hopper and showing the lower part of the press and the transfer mechanism, the rods which hold the parts of the press together being shown in section taken along the line 4—4 of Figure 1.
Figure 22:
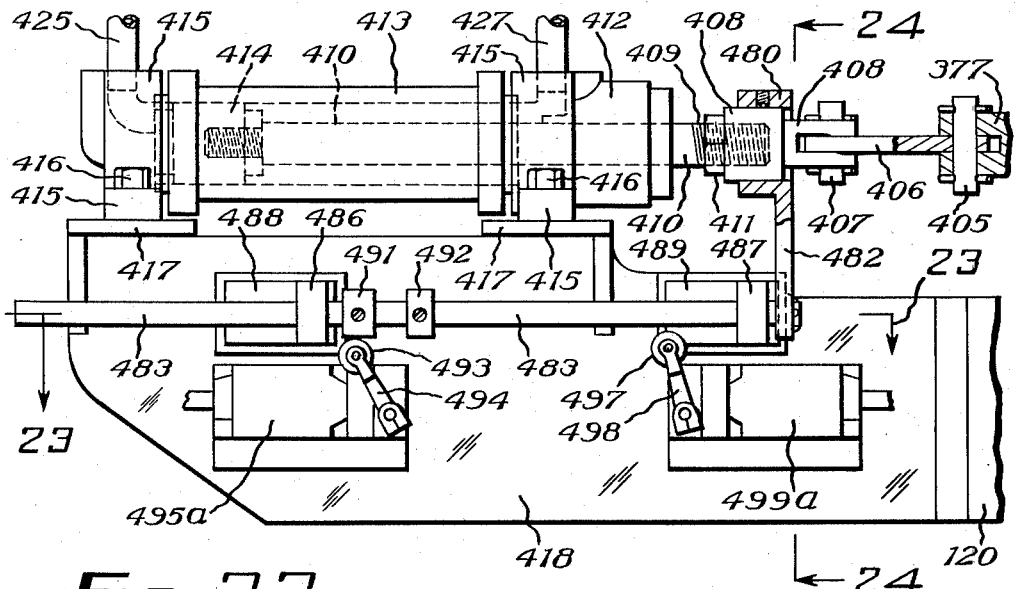

Figure 22 is an elevation of the piston and cylinder unit and connections to operate the charging box, the view being taken from the line 22—22 of Figure 4 and being on an enlarged scale.

Figure 23:
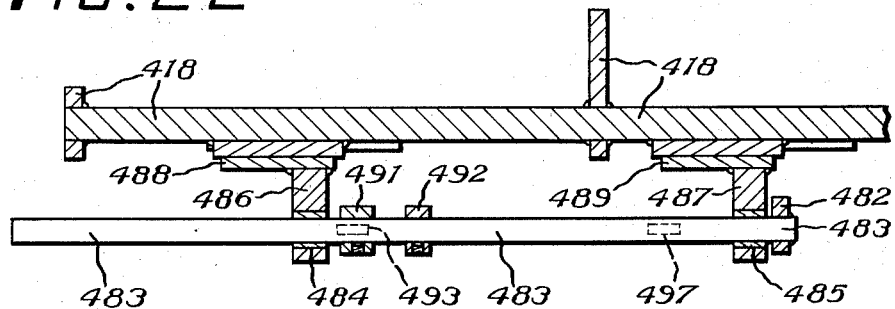

Figure 23 is a sectional view taken on the line 23—23 of Figure 22.

Figure 24:
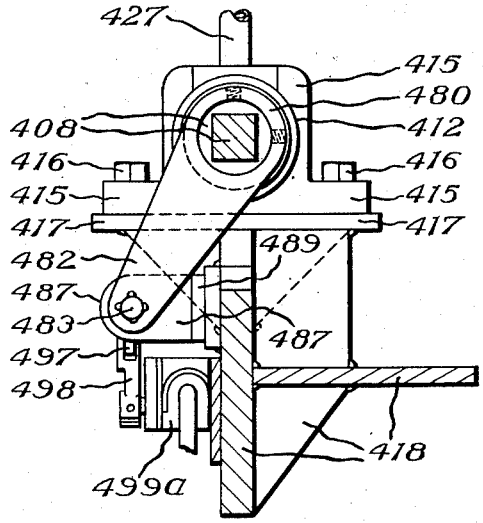

Figure 24 is a sectional view taken on the line 24—24 of Figure 22.

Figure 25:
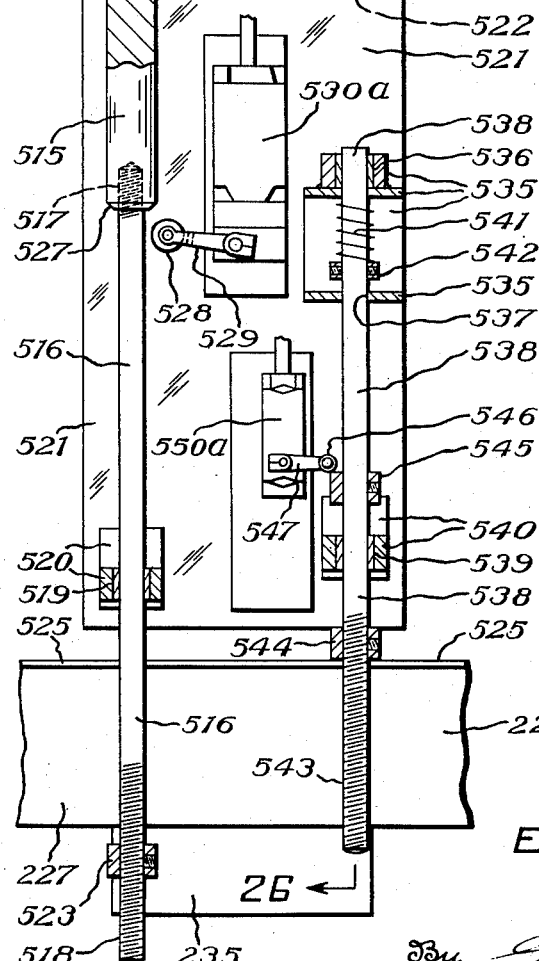

Figure 25 is a view partly in elevation and partly in section of adjustable controlling mechanism located at the upper part of the press.

Figure 26:
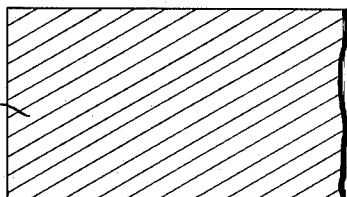

Figure 26 is a sectional view taken on the line 26—26 of Figure 25.

Figure 27 is an elevation of a control located near the bottom of the press.

Figure 28 is a sectional view taken on the line 28—28 of Figure 27.

Figure 29:
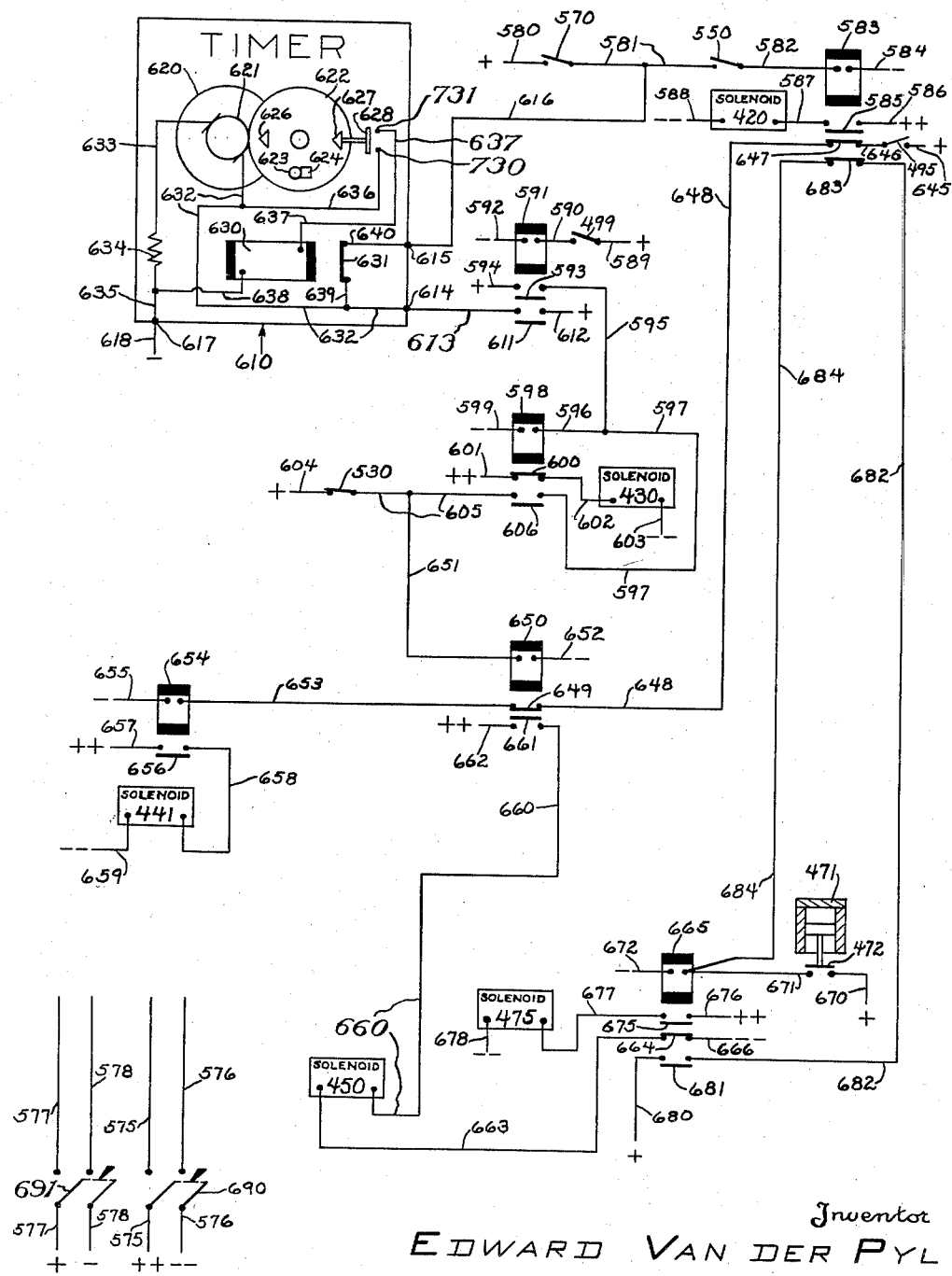

Figure 29 is a wiring diagram illustrating the electrical connections whereby the various limit switches operate the solenoids which in turn operate the valves as shown in Figure 12, and illustrating also the wiring diagram of a timer which can be used to create a dwell during loading of the mold.

Figure 30:
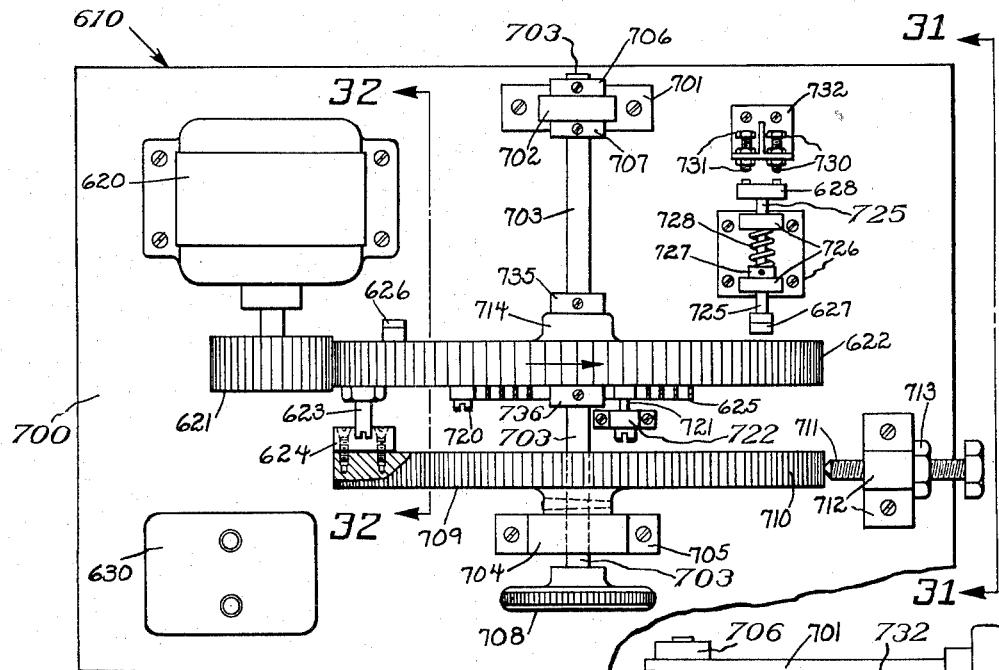

Figure 30 is a plan view of the timer.

Figure 31:
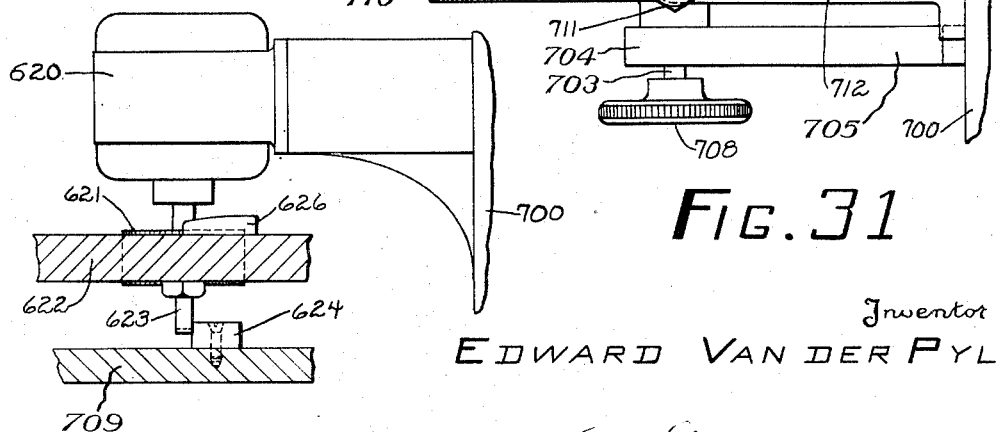

Figure 31 is an elevation of the timer taken from the line 31—31 of Figure 30.

Figure 32:
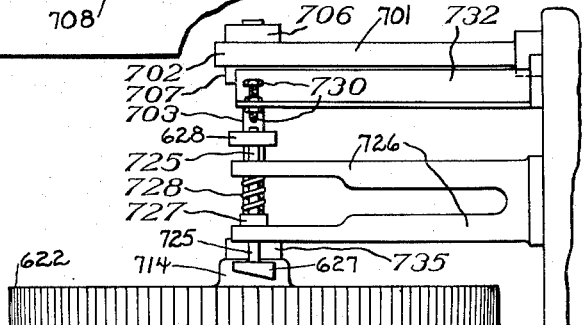

Figure 32 is a vertical sectional view of a portion of the timer taken from the line 32—32 of Figure 30.

Figures 33 to 40 inclusive are sectional views of the valves whose positions and functions in the hydraulic circuits are indicated in Figure 12.

Figure 41 is a vertical axial fragmentary sectional view along the lines of Figures 6, 10 and 11 illustrating equipment for the manufacture of cup-shaped wheels with the press of this invention.

Figure 42 shows additional electrical mechanism in the form of a wiring diagram which modifies a portion of the wiring diagram of Figure 29 for operation of the press to mold such cup-shaped wheels.

Figure 1:
Figure 1 is an elevation of a press constructed in accordance with the invention.

Referring first to Figure 1 the press comprises a massive bed plate 100 which rests upon a concrete foundation 101 having a well 102, the shoulder 103 of the concrete foundation upon which the bed plate 100 rests being faced with protecting plates 104, and leveling bolts 105 with nuts 106 being provided to adjust the bed plate 100 to a horizontal position. An annular cover plate 110 may be provided for the well 102 to keep dirt and tools out of the well and to provide a footing for the operator.

Extending through the bed plate 100 are a plurality of massive rods 111, three being a preferred number. These rods 111 are threaded at the bottom and fitted with nuts 112 under the bed plate 100. The rods 111 near their upper ends have collars 113 secured thereto and the rods extend through a massive cap 114 which is supported by the collars 113. The rods 111 are also threaded at the top and fitted with nuts 115 above the cap 114. The rods 111 with the nuts 112 and 115 thus hold the bed plate 100 and the cap 114 from moving apart under the reactive force developed in operating the press.

Between the bed plate 100 and the cap 114 is a massive mold table 120 through which the rods 111 extend and in which the pressing is done. This mold table 120 rests on sleeves 121 surrounding the rods 111 and extending to the bed plate 100. On the upper side the table is held down by collars 122 on the rods 111.

Referring now to Figure 6, the mold table 120 has extending therethrough a large cylindrical bore 125 merging into a counterbore 126 and a further counterbore 127 on the upper side of the table 120, and merging into a counterbore 128 on the under side of the table 120. A large ring 130 fits the counterbore 128 and has, as shown also in Figure 7 a diametral portion 131 extending across it. The ring 130 with the diametral portion 131 is secured to the table 120 by means of screws 132. The ring 130 has a counterbore 133 on its upper side in which fits a ring 134. On this ring 134 rests a mold band 135 in which the grinding wheel is molded. The apparatus is constructed so that various sizes of mold bands can be used to make various sizes of grinding wheels, such various sizes of mold bands having cylindrical bores of different diameters.

The mold band 135 has shoulders 136 at each end and a ring 137 is secured against the upper shoulder 136 and also, as clearly shown in Figure 6, engages part of the cylindrical outer surface of the mold band 135. The ring 137 fits the counterbores 126 and 127 and is removably secured to the table 120 by means of screws 138. The reason for the lower shoulder 136 on the mold band 135 is so that the mold band can be reversed to distribute the wear thereon.

Referring now to Figure 12, extending through the bed plate 100 is a large cylinder 140 having a circumferential shoulder 141 resting on top of the bed plate 100. This cylinder 140 has an internal cylindrical bore 142 in which fits a large piston 143 having integral therewith a massive ram 145. The ram 145 fits in a packing sleeve 146 which is located in a cylinder head 147 which is cylindrical and has external screw threads 148 that engage internal screw threads inside the upper end of the cylinder 140. At the upper end of the sleeve 146 is a collar 150 resting against a slight shoulder 151 on the sleeve 146 and screws, not shown, extending through the collar 150 and into the head 147 are used to force down the sleeve 146 in the bore of the head 147, the sleeve 146 on the outside and the bore in the head 147 having a slight taper to compress the sleeve and make a close fit between it and the ram 145. The cylinder 140 has, as better shown in Figure 1, lugs 155 through which pass bolts 156 that extend into the bed plate 100, thus to hold the cylinder 140 down on the bed plate, but the thrust of the ram 145 develops a reaction on the cylinder 140 downwardly which is taken by the shoulder 141 on the bed plate 100.

Mounted upon the ram 145 is, as better shown in Figure 6, a ram head 160 which is a massive circular plate to the bottom of which is attached, by bolts not shown, a steel split ring 162 having an inwardly extending lip 163 engaging a groove 164 in the ram 145. The ram head 160, as clearly shown in Figure 6, has a flat bottom which rests upon the flat top of the ram 145; thus an upward thrust of many tons can be imparted to the ram head 160.

Still referring to Figure 6, in the mold band 135 is a mold bottom plate 170. A number of these may be provided, each one fitting in a particular mold band 135, in order that different sized grinding wheels may be molded by the machine. Usually such mold bottom plate 170 has a central hole 171 in which slidably fits an arbor 172 for the purpose of forming a central hole in the grinding wheel. A number of these arbors also may be provided to fit different sized holes 171 in the bottom plates 170 to produce grinding wheels with different sizes of central hole.

The mold bottom plate 170 is removably secured to a pair of steel columns 175 by means of bolts 176. One of these steel columns 175 is shown in Figure 6, and both of them are shown in cross section in Figure 7. They are nearly semi-cylindrical in shape and are spaced far enough apart so that they can move freely on either side of the diametral portion 131. The columns 175 are grooved with axial grooves 177 to accommodate a hub portion 178 of the diametral portion 131. This hub portion 178 has a tapped hole in which fits the reduced threaded end 180 of the arbor 172, whereby the arbor 172 is supported. The heads of the bolts 176 fit in cut-out portions 183 in the sides of the columns 175, the tops of said cut-out portions providing thrust surfaces for the heads of the bolts and the cut-out portions permitting access to the bolts 176.

Referring to Figure 9, the columns 175 have wide shoulders 185 which rest upon the flat top of the ram head 160 and can transmit the thrust of many tons. Extending below the level of the shoulders 185 and into a cylindrical bore 187 in the ram head 160 are a pair of integral extensions 188 of the columns 175. These, as shown in Figure 8, are substantially semi-cylindrical sleeves and have the grooves 177 therein. They also have, as better shown in Figure 9, horizontal conical grooves 190 therein. In these grooves 190 fit the conical noses 191 of long bored plugs 192 which are located in long horizontal bores 193 in the ram head 160. The long bores 193 merge into reduced diameter bores 195 in which the plugs 192 fit with a sliding fit. At the remote ends of the plugs 192 are enlarged portions 197 which fit the bores 193 with a sliding fit. These enlarged portions 197 are counterbored and fitting therein and pinned thereto by pins 199 are the counterbored ends of nuts 201 which are keyed by means of keys 202 to sleeves 203 fitting the bores 193 with a tight fit. Thus the nuts 201 cannot turn but they can transmit a horizontal thrust to the plugs 192.

Extending from one side of the ram head 160 to the other side thereof along a diameter and extending through the nuts 201 and the plugs 192 is a shaft 210 having bolt heads 211 pinned thereto at the ends by means of pins 212. The portions of the shaft 210 just inside the heads 211 are screw threaded with threads 213 and 214 of opposite hand to fit the threads in the nuts 201. It will now be seen that whenever a bolt head 211 is turned in a given direction, the noses 191 of the plugs 192 will be forced against the grooves 190 in the extensions 188 thus to lock the columns 175 to the ram head 160, but when the bolt head 211 is turned in the opposite angular direction the plugs 192 are withdrawn and the columns 175 with the mold plate 170 can be lifted out for replacement of the plate 170 and, if desired, of the columns 175 by similar parts of different sizes.

Referring again to Figure 12, supported by the cap 114 is a large upper cylinder 220 which is coaxial with the cylinder 140. The cap 114 has a vertical bore 221 in which the cylinder 220 fits and the cylinder 220 has a shoulder 222 abutting the under side of the cap 114 to take the thrust of many tons when the press is operating. Above the cap 114 the cylinder 220 is threaded at 223 and a nut 224 thereon holds the cylinder from falling.

In the cylinder 220 is a piston 225 operating a ram 226 to the bottom of which is attached a ram head 227. Referring now to Figures 13 and 14, a multi-part collar 230 has a lip 231 extending into a groove 232 in the ram 226 and the collar 230 is attached to the ram head 227 by means of screws 233.

To the ram head 227 is detachably secured a mold top plate 235 having a central axial bore 236 into which the arbor 172 may extend during the molding operation, this bore 236 opening into a somewhat larger bore 237 to avoid binding or seizure of the parts. It will be noted that the downward thrust of the ram 226 of many tons is transmitted by a flat bottom surface of the ram of considerable area to the flat top of the massive ram head 227 and that the mold top plate 235 contacts the under surface of the ram head 227 over a large area. Thus a powerful downward thrust is readily transmitted to the mold top plate 235.

For locking the mold top plate 235 to the ram head 227 so that the ram 226 can lift the plate 235 out of the mold, mechanism similar to that shown in Figure 6 and already described may be provided. Referring now to Figure 13, the parts and features of this locking mechanism are the same as already described in connection with Figure 6 for locking the extensions 188 of the columns 175 to the ram head 160. Consequently, the description will not be repeated and it is noted that the same parts can be identified in Figure 13 that are shown in Figure 6 and have the same numbers. However, the long bores 193 are, in the ram head 227, slightly offset from a diameter and the noses 191 of the plugs 192 in this case engage a rounded annular groove 240 in an integral upward extension 241 of the mold top plate 235 in which extension 241 the larger bore 237 is located. This extension 241 which except for the groove 240 has a cylindrical outer surface is located in a cylindrical vertical axial bore 243 in the ram head 227 and fits therein with a close fit. The axis of the plugs 192 is slightly above the smallest diameter of the groove 240 so that as the plugs 192 are driven towards each other by turning one of the bolt heads 211, the extension 241 will be urged upwardly thus to attain a tight clamping action.

In order to guide the ram 226 in the cylinder 220 and to form a stuffing box so that the fluid under pressure which lifts the piston 225 shall not escape there is provided, as shown in Figure 12, a packing sleeve 250 in the cylinder 220 and around the ram 226, the packing sleeve 250 having a shoulder 251 engaged by a collar 252 which is bolted by means of bolts, not shown, to the cylinder 220.

Referring now to Figures 1, 4, 6, 10, 11 and 12, and first referring to Figure 10, secured to the top of the ram head 160 are a plurality of blocks 255 which are bored and in which are secured vertically extending cylindrical posts 258. These posts 258 are drilled and tapped at their upper ends to form threaded holes 259 into which are screwed integral threaded projections 260 of cylindrical posts 261 which have similar threaded holes 262 receiving similar threaded projections 263 of short cylindrical posts 264. The posts 261 and 264 have spanner wrench holes 265 so that they can be readily turned. Various additional posts of varying length may be provided so that composite posts of the desired height can be readily assembled. In this case there are shown three composite posts and in any case all the composite posts in use should be of the same height, that is at any time the three are of the same height but can be replaced by three other composite posts of a height that is the same for all of such three but different from that of the first three.

As clearly shown in Figures 10 and 11, the table 120 has vertical cylindrical bores 270 which are aligned with the composite posts and are of a size to permit the composite posts to pass readily through them. Thus as shown in Figure 11, the upper ram head 227 finally contacts the composite posts 258, 261, 264 and thus limits the pressing action. It will be noted that the composite posts are massive and together they can resist the pressure of many tons.

Figure 3:
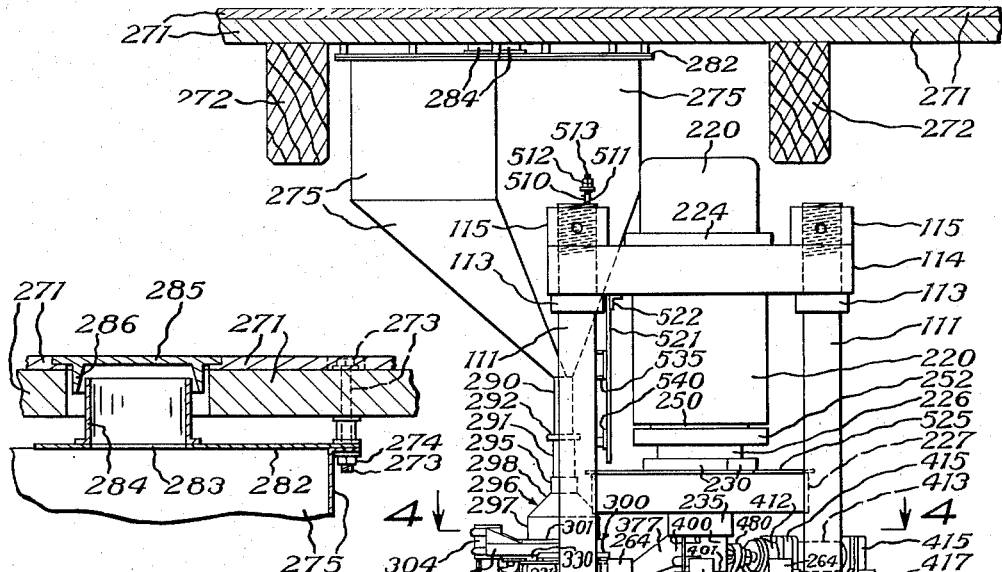
Figure 3 is a sectional view on an enlarged scale of a portion of the hopper that holds the abrasive and bond materials, showing the filling opening and cap therefor.

Referring now to Figure 1, the floor of the building above the press is indicated by the numeral 271, this floor being supported by joists 272. Referring also to Figure 3, bolts 273 extend through the floor 271 and below it and by means thereof and of nuts 274 a large sheet metal hopper 275 is attached to the under side of the floor 271 which is of course the ceiling of the room in which the press is located. This hopper 275 is charged with a suitable mixture of abrasive grain and bond from which grinding wheels are to be molded by the automatic press. The hopper 275 has a top plate 282 in which is an opening 283 surrounded by a charging neck 284 which may be cylindrical as shown and a cap or cover 285 seats in the floor 271 just above the neck 284, the cap 285 having a depending skirt 286 surrounding the neck 284 leaving, however, a slight clearance to prevent the formation of a partial vacuum in the hopper 275 which might retard the flow of material therein. The hopper is of course charged by removing the cap 285 and then shovelling or pouring the material into the neck 284.

As shown in Figures 1 and 15, the hopper 275 tapers toward the bottom and finally merges into a vertical cylindrical pipe 290 on the bottom end of which is telescopically mounted a slightly larger vertical cylindrical pipe 291, the pipe 291 having a collar 292 secured thereto through which pass set screws 293 which may be tightened to secure together the pipes 290 and 291 in a desired position of adjustment. The pipe 291 fits inside of the cylindrical neck 295 of a sheet metal container 296 which is cylindrical at the lower portion 297 and conical at the portion 298 between said lower portion 297 and the neck 295. The container 296 fits snugly in a holder 300 which has a cylindrical portion 301 fitting the outside of the cylindrical portion 297 and a shoulder 302 supporting the bottom of the container 297. The holder 300 has an arm 303 which has a split hub 304 mounted on the top of a shaft 305 and clamped thereto by means of bolts 306 extending through the split. See now also Figure 16. The shaft 305 extends through a split sleeve 310 having an integral flat portion 311 which is secured by bolts 312 to an extension 313 of the table 120. This extension 313 is a frame comprising a flat top 314 and side pieces 315 and 316 made from flat metal and suitably curved, the piece 316 being welded to the edge of the table 120. The sleeve 310 can be clamped to hold the shaft 305 rigidly in any desired position of vertical adjustment by tightening a bolt 317 through the split. When the bolt 317 is loosened the shaft may be raised or lowered by turning a spoke wheel 318 on the end of a shaft 319 which has keyed thereto a pinion gear 320 meshing with a rack 321 secured to the shaft 305 and inset therein in a long slot 322. The shaft 319 is journalled in bearings 323 provided by the sleeve 310.

Referring now to Figures 15, 20 and 21, depending from the holder 300 are a plurality of integral lugs 330 to which is fastened a stationary register 331 in the form of a plate having a plurality of radial cut-outs 332 in the shape of sectors. Supported by the stationary register 331 is an angularly movable register 333 having also a plurality of radial cut-outs 334 in the shape of sectors. By turning the register 333 until the sectors 332 and 334 are in register, material contained in the container 296 can pass therefrom into a charging box 335 which will be more fully described hereinafter. By turning the register 333 until the cut-outs 334 are staggered with relation to the cut-outs 332, material is prevented from flowing out of the container 296. Figure 21 shows the cut-outs out of register, that is in the closed position. Figure 20 shows the cut-outs in register, that is to say in the open position. As shown in Figure 15 a small cone 336 is secured by a bolt 337 to the movable register 333 and the head of the bolt 337 acts as a trunnion fitting in a hole in the stationary register 331.

Referring now to Figure 4 and Figure 20, automatic fluid pressure apparatus is provided for moving the register 333 to the open and closed positions respectively. An arm 340 integral with the register 333 is connected by a pin 341 to a link 342 which is connected to the end of a piston rod 343 by means of a pin 344. The piston rod 343 extends through a stuffing box nut 345 and through a stuffing box head 346 having packing 347 into a cylinder 348 having at the other end a head 349. In the cylinder 348 on the piston rod 343 is a piston 350. A source of air under pressure is connected by a pipe 351 having a hand valve 352 to a T union 353 to which are connected hoses 354 and 355. The hose 354 is connected to port 356 extending through one end of the cylinder 340 as shown. The hose 355 is connected to a port 357 in a valve casing 358 which may be integral with the cylinder 348. Extending the length of the valve casing 358 is a cylindrical valve chamber 359 in which is a valve piston 360 with a reduced diameter portion 361. The valve piston 360 has a piston rod 362 which extends through a head 363 blocking one end of the valve chamber 359. Contacting the other end of the piston 360 is a spring 365 which is held in the chamber 359 by a head 366 blocking the other end of the chamber 359. A port 367 extends into the chamber 359 where the spring 365 is located, thus to prevent entrapped air from blocking movement of the piston valve 360. When the piston valve 360 is in the position illustrated in Figure 20, the reduced portion 361 connects a port 370, leading to the outside air, to a port 371 in the casing 358 which is connected to a long passage 372 and then to a port 373 extending to the inside of the cylinder 348 adjacent the head 349. This drops the pressure in the cylinder 348 adjacent the head 349 to atmospheric. But at all times when the valve 352 is open (this is merely a hand shut-off valve) the port 356 is connected to pressure. Therefore the piston 350 is held by the air under pressure from the line in the position shown in Figure 20 holding the register 333 in the open position. But when the piston valve 360 under the influence of the spring 365 moves to carry the reduced portion 361 into register with the port 357, at this time also closing the port 370, air under pressure goes from hose 355 through port 357 by reduced portion 361 through port 371 through passage 372 through port 373 into the cylinder 348 adjacent the head 349 and this forces the piston 350 in the direction of the stuffing box 346 thus moving the arm 340 and closing the register. The cylinder 348, as shown in Figure 16, is supported by a bent plate 374 attached to the top of the holder 300.

Referring now to Figures 19 and 20, the charging box 335, which is shown as comprising a metal hoop, is attached to a block 375 to which is attached by means of screws 376 an arm 377. Secured to the arm 377 by means of screws 378 is an arm 380. Referring to Figures 15, 17, 18 and 19, the outer end of the arm 380 is slightly raised and seated thereon is a block 381 having an integral inverted U-shaped saddle portion 382 straddling the arm 380 and secured thereto by means of a screw 383. A contacting screw 384 held by a lock screw 385 in the block 381 is in position to engage the piston rod 362, while a contacting screw 386 held by a lock screw 387 in the arm 380 is in position to engage the rod 362 when the holder 300 is lowered for use with a smaller charging box 335a, Figure 17, in which case the block 381 is removed. When the charging box 335 is moved under the registers 331—333, the screw 384 contacts the valve piston rod 362 moving it to the position shown in Figure 20. This causes a load of the material to be dumped by the container 296 into the charging box 335 until the box is full. As shown in Figure 15, the charging box has a close fit with the under side of the stationary register 331 and also a close fit with a plate 389 on top of the flat top 314 of the extension 313, the plate 389 extending also to and beyond the ring 137 in the table 120. Now it will be seen why the holder 300 is made adjustable up and down, for it is desired to have a snug fit between the registers and the charging box 335. Furthermore, for molding different sizes of grinding wheels, it is desirable to have charging boxes 335 of different heights as already indicated.

When the arm 377 moves the charging box 335 in the direction of the mold, the arm 380 and therefore the screw 384 leaves the valve rod 362 and thereupon the spring 365 moves the valve piston 360 which admits air under pressure to the cylinder 348 adjacent the head 349 and this, because of the greater area of the end of the piston 350 as compared with the difference between its area and the area of the rod 343, causes the piston 350 to move to close the register, thus allowing no more material to escape from the container 296.

In order that the material shall not be compacted by the movement of the charging box 335 to a greater extent in that portion thereof near the block 375 than at points remote therefrom, I preferably provide a honey-comb structure 390 which may be made out of sheet metal and may have any configuration, for example as shown, the purpose being to divide the cylindrical space inside of the hoop into many compartments such as the small hexagonal compartments 391, the trapezoidal compartments 392 and the elongated compartments 393. Other geometric arrangements may be adopted.

When a mixture has been molded into a grinding wheel, it is brought to the level of the plate 389 by the mold bottom plate 170. Before charging the mold with more mixture the molded grinding wheel W should be removed. Accordingly on the forward side of the charging box 335 I provide a pusher 395 in the form of a piece of sheet metal welded at 396 to the charging box 335 and having an arcuate portion 397 faced on the outside with some soft material 398 such as sponge rubber. When the charging box 335 moves to a position over the mold bottom plate 170, the rubber 398 contacts the already formed grinding wheel and gently pushes it out of the way onto the far side of the plate 389. If the machine has no attention from the operator, one molded grinding wheel W will push the one in front of it out of the way and so on, but it is contemplated that the operator will remove the wheels about as fast as they are made.

Figure 5:
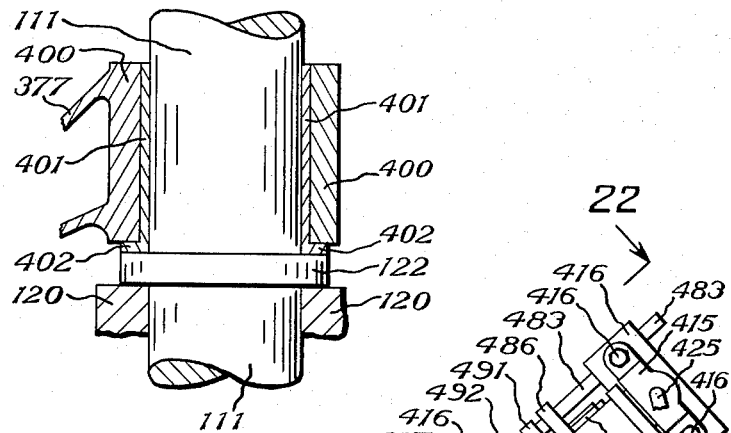
Figure 5 is an enlarged sectional view taken along the line 5—5 of Figure 4.

Referring now to Figures 4 and 5, the arm 377 which holds and moves the charging box 335 has a split hub 400 one part of which is integral with the arm 377 and the other part of which is bolted to the first part by bolts not shown. This split hub 400 is located on a split sleeve 401 surrounding one of the rods 111, the split sleeve having a shoulder 402 resting on a collar 122 and the split hub 400 resting upon the shoulder 402 as shown. The arm 377 is connected by a pin 405 to a link 406. Referring now to Figure 22, the link 406 is connected by a pin 407 to a clevis head 408 which is internally screw threaded to receive a screw threaded end 409 of a piston rod 410. A nut 411 secures these parts from moving. The piston rod 410 extends through a cylinder head 412 into a cylinder 413 where the piston rod 410 has a piston 414. Fluid under pressure, preferably hydraulic fluid such as oil, is admitted alternately to opposite ends of the cylinder 413 to move the arm 377 and thereby to move the charging box 335 from one position to the other. The cylinder 413 is secured in position by means of clamps 415 secured by bolts 416 to table portions 417 of an extension 418 bolted to the mold table 120 by means of bolts 419.

When the press is idle the charging box 335 is under the container 296 and the charging box contains a mixture of abrasive and bond ready to be molded into a grinding wheel. At this time the upper ram 226 is in its uppermost position and the lower ram 145 is likewise in its uppermost position, both as shown in Figure 12. When the operator starts the machine to operate automatically, electrical mechanism which will hereinafter be described energizes a solenoid 420 which operates a valve 421 which admits fluid under pressure from a low pressure line 422 into a pipe 423 which is connected to a flow control valve 424, the other side of which is connected by a pipe 425 to the left hand end (Figure 22) of the cylinder 413. The right hand side of the cylinder 413 is always connected to the low pressure line 422 by means of a pipe 427. The piston 414 moves to the right, Figure 22, whenever the pressure is exerted against its left hand side because the area of the piston rod 410 reduces the effective area of the piston 414 on the right hand side. Thus the charging box 335 moves in a counterclockwise direction, Figure 4, to carry the charge over the bottom plate 170. The charging box 335 stops at a variable position some part of it being over the plate 170 and at this moment the ram 145 moves downwardly carrying down the plate 170. This action takes place by the deenergization of a solenoid 430 which operates a pilot valve 431 which moves a valve 432 allowing fluid from the bottom of the cylinder 140 to exhaust by way of a pipe 433 through the valve 432 and then by way of a pipe 434 to a supply tank. The limited area of the upper side of the piston 143 is at this time under low pressure by way of a pipe 435 which is connected to a valve 436 which at this time connects the pipe 435 to a pipe 437 which branches into a pipe 438 which leads to the low pressure supply pipe 422. As the plate 170 descends, a charge of abrasive and bond drops into the cavity thereby formed inside of the mold band 135. After a period of dwell which is provided for by mechanism to be hereinafter explained, the charging box 335 swings in a clockwise direction back to its starting position and thereupon receives a fresh charge of abrasive and bond in the manner already explained. This action is caused by the deenergization of the solenoid 420 which causes the valve 421 to shift thus connecting the pipe 423 to an exhaust pipe 440 and since the right hand side of the piston 414 is always under pressure, it moves to the left thus returning the charging box 335. At this juncture a solenoid 441 is energized which actuates a pilot valve 442 which moves a valve 443 to admit fluid under low pressure from the line 422 through a pipe 444 having a check valve 445 and into a pipe 446 which leads to a pipe 447 which leads to the upper end of the cylinder 220. The limited area of the underside of the piston 225 is always under high pressure by way of a high pressure line 448 having a needle valve 449.

The pressure in the low pressure line 422 may be for example 300 pounds to the square inch and the pressure in the line 448 may be for example 2500 pounds to the square inch. However so much greater is the area of the piston 225 than the area thereof minus the ram 226 that the lower pressure prevails over the high pressure and of course the considerable weight of the parts is also acting to move them downwardly. The action however forces the high pressure fluid back into the line 448 and the fluid must travel through the needle valve 449 so therefore the speed of downward movement can readily be controlled by means of the needle valve 449.

At a time in the cycle of operation which is adjustable but which is generally at the moment when the top mold plate 235 enters the mold band 135, the lower ram 145 is caused to move upwardly while the upper ram 226 continues to move downwardly; ultimately both motions are stopped by the contacting of the posts 264 with the ram head 227 as already explained. The motion of the two rams towards each other is at first under low pressure and the low pressure line 422 transmits fluid in large volume per unit of time. Eventually, however, when back pressure is built up by the resistance of the material being molded, the pressure automatically rises and both rams are thereafter forced towards each other by the full pressure of the line 448. The transfer of actuation from the low pressure line 422 to the high pressure line 448 is not only automatic but takes place without any further shifting of valves. This control gives the double advantage of rapid movement in the early stages and high pressure in the later stages in order to compact the material into a strong article. Furthermore, it is achieved with economy of the high pressure fluid. These actions take place as follows.

At the instant hereinbefore indicated, namely when the mold top plate 235 entered the mold band 135 or just before or just after this event, the solenoid 441 was deenergized, the solenoid 430 was energized and a solenoid 450 was energized. Deenergization of the solenoid 441 shifts the pilot valve 442 to move the valve 443 to disconnect pipes 444 and 446. Energization of the solenoid 450 shifts a pilot valve 451 which shifts the valve 436 to connect the pipe 435 to a pipe 452 which is connected to the pipe 447. At the same time the shifting of the valve 436 shuts off the pipe 435 from the pipe 437. Thus the upper end of the cylinder 140 is now connected to the upper end of the cylinder 220. At the same time the pilot valve 451 itself connects a series of pipes 453, 454, 455 and 456 to a pipe 457 running to a valve 458. The pipe 453 comes out of the low pressure line 422 and thus fluid under low pressure is admitted to the valve 458. This valve 458 is opened when the fluid under low pressure is admitted through the pipe 457 thereby to connect pipes 459 and 460. In the pipe 460 is a throttle valve 461 and the pipe 460 is connected to the high pressure line 448. The pipe 459 is connected to a pipe 462 and when the solenoid 430 was energized, the pilot valve 431 was operated to shift the valve 432 to connect the pipe 462 with the pipe 433. However, the pipe 438 leading from the low pressure line 422 is connected by means of a pipe 463 with the pipe 462, there being a check valve 464 in the pipe 463. Now it will be seen that both high and low pressure are connected to the bottom of the cylinder 140 but the high pressure will not enter the main low pressure line 422 because the check valve 464 prevents it from so doing, and furthermore, the high pressure fluid will not at first take control of the operation because its flow is restricted by the throttle valve 461. However, when the low pressure can no longer do the job, the high pressure will. And as the ram 145 moves upwardly, the ram 226 moves downwardly at the same rate since fluid is forced by the piston 143 through the pipe 435 to the pipe 452 to the pipe 447 to the upper end of the cylinder 220.

For supplying fluid to the pilot valve 442 there is a pipe 465 connecting the pilot valve 442 to the pipe 453 which is connected to the low pressure line 422. For supplying fluid to the pilot valve 431 there is a pipe 466 connected to the pipe 455 which through pipes 454 and 453 is connected to the low pressure line 422.

When movement of the rams 145 and 226 towards each other is stopped by the contact of the blocks 264 with the ram head 227, pressure is built up in the system and is carried by a pipe 470 to a piston-cylinder unit 471 which under this extremely high pressure actuates a switch 472 in a switch box 472a. This causes deenergization of the solenoid 450 and energizes a solenoid 475. This action moves the pilot valve 451 which moves the valve 436 again to connect the pipe 435 to the pipe 437 and at the same time cuts off the pressure to the pipe 457 thus shifting the valve 458 to disconnect the pipes 459 and 460. Energization of the solenoid 475 operates a pilot valve 476 to shift the valve 443 to connect the pipe 446 to an exhaust pipe 478. Fluid to supply the pilot valve 476 comes from pipe 454 by way of a pipe 477. Now the high pressure from the line 448 through the valve 449 can move upwardly the ram 226 and the fluid will exhaust through the pipe 447 and 446 to the exhaust pipe 478 as the piston 225 moves upwardly. At the same time high pressure has been disconnected from the bottom of the cylinder 140 but the low pressure from the line 422 via the pipe 438, pipe 463, pipe 462 and pipe 433 enters the lower end of the cylinder 140 to continue the upward movement of the ram 145 thus carrying the pressed grinding wheel W out of the mold ring 135. The bottom mold plate 170 is stopped right on the level of the plate 389 by the blocks 255 coming in contact with the table 120, but the ram 226 continues to rise to carry the mold top plate 235 well up out of the path of the charging box 335 when it returns during the succeeding cycle of operation. The press has now completed one cycle. The cycle immediately repeats since the solenoid 420 is reenergized as will be hereinafter explained.

Out of precaution I have provided a relief valve 479 connected to the pipe 435 so that in case the piston-cylinder unit 471 is set to operate at a dangerous high pressure, the relief valve 479 will operate to save the apparatus from a smash. This relief valve 479 is therefore in the nature of a safety valve and the molding press is operable without it. Naturally the valve 479 should be set to open at a higher pressure than that at which the unit 471 is expected to operate.

The automatic cycle of operation of the molding press is controlled by various limit switches and relays which operate the various solenoids above mentioned. These limit switches are operated mechanically by movement of the various parts. Such mechanisms are shown in Figures 22 to 28 inclusive. Referring now to Figures 22, 23 and 24, surrounding and secured to the clevis head 408 is a hub 480 having an arm 482 which is secured to a rod 483 that is slidable in bearings 484 and 485 in brackets 486 and 487 on plates 488 and 489 secured to the extension 418. On the rod 483 are dogs 491 and 492 which can be secured in adjusted position thereon. When the charging box is under the registers 331 and 333, the piston 414 is to the left as shown in Figure 22, and the dog 491 is in contact with the roller 493 of a switch arm 494 of a limit switch 495 in a box 495a. When the charging box 335 moves to a position over the mold band 135, the actuating piston 414 has moved to the right, Figure 2, and the dog 492 contacts the roller 497 on a switch arm 498 of a limit switch 499 in a box 499a. These boxes 495a and 499a are secured to the face of the extension 418.

Referring now to Figures 25 and 26, extending through the cap 114 is a long bolt 510 surrounded by a spring 511 which bears at one end upon the top of the cap 114 and at the other end against nuts 512 adjustably positioned on a threaded end 513 of the bolt 510. The bolt 510 is likewise threaded at its lower end 514 and is thereby secured to a shaft 515 which is secured to a long bolt 516 having an upper threaded end 517 and a lower threaded end 518. The bolt 516 is slidable in a bearing 519 in a bracket 520 secured to a heavy sheet metal panel 521 which is secured to the under side of the cap 114 as by means of an angle iron 522 and a welding operation. The bolt 516 is slidable in the cap 114 and it will be seen that the entire assemblage of bolt 510, shaft 515 and bolt 516 can move downwardly from the position shown in Figure 25, crushing the spring 511, but this assembly cannot move upward beyond the position shown in Figure 25.

Upon the threaded end 518 of the long bolt 516 is a dog 523 in the form of a nut which can be secured in any position of adjustment. Secured to the upper side of the upper ram head 227 is a flat ring 525 which projects beyond the periphery of the ram head 227 as clearly shown in Figure 26. When the ram head 227 moves to its lowermost position, the flat ring 525 contacts the dog 523 and moves the assembly of bolt 516, shaft 515 and bolt 510 downwardly. The shaft 515 has a beveled shoulder 527 which will then contact a roller 528 on a switch arm 529 of a limit switch 530 in a box 530a.

Still referring to Figures 25 and 26, mounted upon the panel 521 is a U-shaped bracket 535 supporting a bearing 536 on one leg of the U and having a hole 537 on the other leg of the U, through which bearing and hole passes a rod 538 which is movable vertically. The rod 538 likewise passes through a bearing 539 in a bracket 540 secured to the panel 521. A spring 541 around the rod 538 between the legs of the U-shaped bracket 535 contacts a collar 542 fastened to the rod 538 and tends to keep the rod 538 at a low position but can be crushed to permit the rod 538 to move upwardly. The lower end of the rod 538 is threaded as shown at 543 and adjustably located on this threaded end is a nut 544. When the upper ram head 227 is in its upper position, the flat ring 525 is in engagement with the nut 544 and has raised the rod 538 bringing an adjustable collar 545 thereon into engagement with a roller 546 on a switch arm 547 of a limit switch 550 in a switch box 550a.

Referring now to Figures 27 and 28, secured to the bed plate 100 is a bracket 555 having a pair of bearing arms 556 and 557 supporting bearings 559 and 560 through which extends a rod 561. This rod 561 is, like the rod 538 and the combination of bolts 510 and 516 with the shaft 515, movable vertically. In the case of the rod 561 gravity is relied upon to keep it in a downward position. It has an upper threaded end 563 having thereon an adjustable nut 564 in the path of a flat ring 565 like the ring 525, this ring 565 being secured to the under side of the lower ram head 160 and projecting outwardly from the peripheray thereof. Accordingly, when the lower ram head 160 rises, the ring 565 will engage the nut 564 and raise the rod 561. The lower position of the rod 561 is limited by a collar 566 adjustably secured thereto which will contact the bearing 560. To the bottom of the rod 561 is secured a disc 568 which, when the rod 561 is moved upwardly, contacts and raises a plunger 569 to operate a limit switch 570 in a switch box 570a.

The manner in which the various switches whose actuation is above described control the solenoids which in turn control the valves (as heretofore described) to move the various elements of the molding press, automatically to make, from a suitable mixture of abrasive and bond, pressed "green" grinding wheels W is disclosed in the wiring diagram of Figure 29. I have found it desirable to use for electrical control two sources of electric current at different voltages, for example I may use 220 volts to actuate relays responsive to the closing of the limit switches and 440 volts to actuate the solenoids responsive to closing of the relay operated contacts. Alternating current, usually 60 cycles, is readily available everywhere, whereas direct current is not so widely available and consequently utilization of alternating current will be preferred in most factories. This can be single phase. All of the relays, solenoids and other devices indicated in Figure 29 can be operated by single phase, 60 cycle alternating current, using respectively 220 E. M. F. and 440 E. M. F., but the electrical mechanism hooked up as shown in the diagram can equally well be operated by direct current at two different voltages. In order to make the wiring diagram easier to understand by avoiding scores of instances of crossing wires, I indicate one side of the high voltage power line 575 by the symbol ++, the other side of the high voltage line 576 by the symbol ——, and one side of the low voltage line 577 by + and the other side of the low voltage line 578 by —.

Referring now to Figure 29, the switch 570 which is closed when the lower ram is up is connected by a wire 580 to the + line 577 and the other side of the switch 570 is connected by a wire 581 to the switch 550 which is closed when the upper ram is up and otherwise is open. The other side of the switch 550 is connected by a wire 582 to the coil of a relay 583, the other end of the coil being connected by a wire 584 to the — line 578. When the relay 583 is energized, it closes a switch 585. One wire 586 connects one side of the switch 585 to the ++ line 575 while another wire 587 connects the switch 585 to the solenoid 420. The other side of the solenoid 420 is connected by a wire 588 to the —— line 576. This is the solenoid that sends the charging box 335 from its position under the registers 331 and 333 to its position above the mold band 135.

When the charging box 335 has practically completed this trip the limit switch 499 is closed, this being a normally open limit switch. The switch 499 is connected by a wire 589 to the + line 577. The other end of this switch 499 is connected by a wire 590 to the coil of a relay 591, the other end of which coil is connected by a wire 592 to the — line 578. The relay 591 upon being energized closes a switch 593 which is connected on one side by a wire 594 to the + line 577 and on the other side to a wire 595 which branches into wires 596 and 597. The wire 596 is connected to the coil of a relay 598 the other end of which coil is connected by a wire 599 to the — line 578. Thus, when the switch 593 is closed by the relay 591, the relay 598 is energized.

This action deenergizes the solenoid 430 which, as will be remembered, when energized holds the lower ram 145 up and therefore when deenergized allows it to move down. So therefore abrasive and bond drop out of the charging box 335 into the mold band 135. Deenergization of the solenoid 430 responsive to energization of the relay 598 takes place as follows: A normally closed switch 600 is opened by the relay 598 and this switch 600 has a wire 601 connecting it to the ++ line 575 and a wire 602 connecting it to the solenoid 430 the other end of which is connected by a wire 603 to the —— line 576.

The lower ram 145 having thus gone down remains down even though the charging box 335 returns to its position under the registers 331 and 333 thus opening the switch 499 and deenergizing the relay 591. To this end I provide a holding circuit for the relay 598 as follows: Starting with a wire 604 connecting one side of the switch 530 to the + line 577, then to a wire 605 to a switch 606 which is closed by energization of the relay 598, then from the switch 606 by the wire 597 to the wire 596 to the relay 598 to the wire 599 to the — line 578. Since the switch 530 is a normally closed switch, the holding circuit is made and the relay 598 remains energized. This switch 530 is actuated when the mold top plate 235 is approximately entering the mold band 135, but until that time the solenoid 430 remains deenergized.

The charging box 335 should move outwardly after the lower ram 145 goes down, but it should not move outwardly the instant the lower ram 145 starts down as in that event the mold may not receive a full charge of material. I provide an adjustable period of dwell during which the charging box 335 remains over the mold. This takes care of the situation nicely and insures time for the mold bottom plate 170 to descend and time for the mixture to break loose from the honey comb 390 in the charging box 335 and fall into the mold band 135. This period of dwell is provided by a timer 610, the details of which are shown in Figures 30, 31 and 32, the wiring of which, however, is clearly shown in Figure 29. The relay 591 when energized closes a second switch 611 which is connected by a wire 612 to the + line 577 and which is connected by a wire 613 to a terminal 614 of the timer. Another terminal 615 of the timer 610 is connected by a wire 616 to the wire 581. The timer has a third terminal 617 which is connected by a wire 618 to the — line 578.

Any one of a multitude of different timers could be used and most electrical timers provide for various hook-ups for adaptation to particular circuits and requirements. However, I show herein a simple timer which is adequate for my purposes and which will measure time intervals between one and ten seconds which is the amount of dwell desired. As shown, the timer comprises an electric motor 620 which drives a pinion gear 621 which drives a spur gear 622 which has a pin 623 to engage an adjustable stop 624. When the motor 620 is deenergized, a clock spring 625 (Figure 30) turns the gear 622 back to cause the pin 623 to engage the adjustable stop 624. The gear 622 can drive the pinion gear 621 since the motor 620 is a relatively frictionless motor. It should be a small, low-powered motor which turns the armature slowly. Such motors operating from alternating current are on the market and are referred to as clock motors. Direct current motors which turn slowly are also available. Connected to the gear 622 is a cam 626 which will move a detent 627 to operate a switch 628.

In the timer 610 is a relay 630 operating a normally closed switch 631. The terminal 614 is connected by a wire 632 to the motor 620. The other side of the motor 620 is connected by a wire 633 to a resistance 634 which is connected by a wire 635 to the terminal 617. The wire 632 is further connected by a wire 636 to the switch 628. The switch 628 is further connected by a wire 637 to the relay 630. The relay 630 is further connected by a wire 638 to the wire 635. The wire 632 is further connected by a wire 639 to the switch 631. The switch 631 is further connected by a wire 640 to the terminal 615.

The action is as follows: As will further appear from the description of Figures 30, 31 and 32, the adjustable stop 624 can be positioned to give various intervals of time. It will be remembered that when the charging box 335 moved to the mold, the switch 499 was closed. This energized the relay 591 and closed the relay switch 611. Current now runs from the + line 577 via wire 612, switch 611, wire 613 to terminal 614 then by wire 632 to wire 639 to normally closed switch 631 to wire 640 to terminal 615 to wire 616 to wire 581 to switch 550 to wire 582 to relay 583 to wire 584 to the — line 578. Thus the relay 583 continues to be energized even though the downward movement of the lower ram 145 opens the switch 570. So therefore the switch 585 remains closed continuing to energize the solenoid 420 which keeps the charging box over the mold. However, energy from the + line 577 also flows from the terminal 614 through the wire 632 into the motor 620 going from the motor 620 via the wire 633 the resistance 634 and wire 635 to the terminal 617 and wire 618 to the — line 578. The motor 620 therefore starts running. This rotates the spur gear 622 eventually to cause the cam 626 to strike the detent 627 which closes the switch 628 and now relay 630 is energized. This occurs as follows: Energy from the + line 577 at the terminal 614 goes via wire 632 and wire 636 to the switch 628 then by wire 637 to the relay 630 then by wire 638 to the wire 635 to the terminal 617 to the wire 618 to the — line 578. This of course opens the normally closed switch 631 and now all circuits to the relay 583 are broken so the switch 585 opens, the solenoid 420 is deenergized and the charging box 335 goes out, that is to the registers 331 and 333. As the charging box moves out the switch 499 opens and this deenergizes the relay 591 which opens the switch 611 which cuts off power from the + line 577 to the timer 610 and therefore the clock spring 625 resets the timer. With the resetting of the time the circuit is made at the switch 631 but it has already been broken at the switch 611 by the opening of the switch 499 and hence the timer 610 will not be reenergized until the next cycle.

When the charging box 335 has moved all the way out, the switch 495, which is a normally open switch, is closed. Since the lower ram 145 is down the switch 570 is open and since the circuit through the timer was broken the relay 583 remains deenergized. Closing of the switch 495 results in energization of the solenoid 441 which starts the upper ram 226 downward under low pressure. This takes place as follows: The switch 495 is connected by a wire 645 to the + line 577. The switch 495 is likewise connected by a wire 646 to a normally closed switch 647 operable by the relay 583. The switch 647 is connected by a wire 648 to a normally open switch 649 which is, however, at this moment closed because it is controlled by a relay 650 which is connected by a wire 651 to the wire 605 on one side and by a wire 652 to the — line 578 on the other side. Current from the + line 577 can therefore flow through wire 648 and switch 649 to a wire 653 to a relay 654 and thence by a wire 655 to the — line 578. This energizes the relay 654 which closes a normally open switch 656 which connects a wire 657 from the ++ line 575 to a wire 658 to the solenoid 441 the other end of which is connected by a wire 659 to the —— line 576. Thus, the solenoid 441 is energized and the upper ram 226 descends.

As heretofore explained, when the mold top plate 235 carried by the ram 226 is about to enter the mold band 135, the switch 530, a normally closed switch, is opened. The exact moment is adjustable by adjusting the position of the dog 523 on the threaded end 518. At the moment or position of parts desired the flat ring 525 carried by the upper ram head 227 strikes the dog 523, the bolt 516 is moved downwardly thus moving downward the shaft 515 having the shoulder 527 which action opens the switch 530. This action deenergizes the solenoid 441, reenergizes the solenoid 430 and energizes the solenoid 450. It has hitherto been explained how the solenoids in this condition direct fluid under low pressure to raise the ram 145 and to continue the downward movement of the ram 226 at the same rate as the upper movement of the ram 145. The action takes place as follows: The current can no longer flow through the wire 651 since the switch 530 is open. So the relay 650 is deenergized and this causes the switch 649 to open which cuts off current to the relay 654 which opens the switch 656 which deenergizes the solenoid 441. So also by the opening of the switch 530 current can no longer flow through the switch 606 so the holding circuit for the relay 598 is broken and the switch 600 closes thus energizing the solenoid 430. The solenoid 450 is connected by a wire 660 to a normally closed switch 661 operated by the relay 650 so now the switch 661 is closed. The other side of the switch 661 is connected by a wire 662 to the ++ line 575. The other side of the solenoid 450 is connected by a wire 663 to a normally closed switch 664 operated by a relay 665. The other side of the switch 664 is connected by a wire 666 to the —— line 576. The relay 665 is at this moment deenergized so the circuit is complete through the solenoid 450 and it is actuated. It has already been explained how, when back pressure is exerted by the material being molded upon the pressure fluid, the high pressure is automatically exerted to compress the material in the mold to the desired density. Ultimately, when the posts 264 contact the upper ram head 227, the pressure in the pipes including the pipe 470 rises to operate the piston cylinder unit 471 to close the switch 472. This switch 472 is connected by a wire 670 to the + line 577 and by a wire 671 to the relay 665. So prior to actuation of the switch 472, the relay 665 is dead thus leaving the switch 664 closed. But when the molding operation is completed and the switch 472 has closed, current flows from the + line 577 through wire 670 switch 472 wire 671 to the relay 665 and by a wire 672 to the — line 578 thus energizing the relay 665 which opens the switch 664 which deenergizes the solenoid 450. Energization of the relay 665 closes a normally open switch 675 connected by a wire 676 to the ++ line 575 and by a wire 677 to the solenoid 475 which is connected by a wire 678 to the —— line 576. Thus when the grinding wheel W is fully pressed, the switch 472 closes energizing the solenoid 475 and deenergizing the solenoid 450. This causes, as heretofore explained, both rams to rise under low pressure. The switch 472 automatically opens but this does not deenergize the relay 665 since this relay is provided with a holding circuit. A wire 680 from the + line 577 is connected to a holding switch 681 closed by the relay 665 and the switch 681 is connected by a wire 682 which leads to a switch 683 operated by the relay 583. The switch 683 is a normally closed switch, that is when the relay 583 is deenergized. The switch 683 is connected by a wire 684 to the relay 665 to the + side thereof, so once the relay 665 is energized it remains energized so long as the switch 683 is closed. When, however, both rams are up, the switches 570 and 550 are closed and this energizes the relay 583 which opens the switch 683 which deenergizes the solenoid 475 but cannot at this time reenergize solenoid 450 because the switch 530 is now closed.

The cycle of operation now repeats thus turning out another pressed "green" grinding wheel W. The cycle of operation continues to repeat to produce more wheels so long as the hopper 275 contains material and so long as the press is supplied with fluid under pressure and the power lines 575, 576, 577 and 578 are energized. I provide a double pole hand switch 690 across the lines 575 and 576 for energizing and de-energizing at will all the circuits deriving power therefrom. Similarly I provide a double pole hand switch 691 across the lines 577 and 578 to energize and deenergize at will all the circuits supplied with power from those lines.

Referring now to Figures 30, 31 and 32, the timer mechanism is shown as mounted on a base 700. To the base 700 is fastened a bearing bracket 701 having a bearing portion 702 mounting for revolution a shaft 703 which also extends through a bearing portion 704 of a bearing bracket 705 which is fastened to the base 700. The shaft 703 is restrained from axial movement by collars 706 and 707 fastened thereto on either side of the bearing portion 702. Fastened to the shaft 703 is a knurled knob 708 whereby it may be turned by hand. Likewise fastened to the shaft 703 is a wheel 709 having a roughened periphery 710 adapted to be engaged by a bolt 711 extending through a bracket 712 secured to the base 700. The wheel 709 carries the adjustable stop 624 the position of which may be varied by turning the wheel 709 by means of the knurled knob 708, thus to vary the time interval, and after the desired adjustment has been made the bolt 711 is tightened and secured with a nut 713.

The pin 623 is secured to the gear 622 whose hub 714 is mounted on the shaft 703, the gear 622 being freely revoluble on this shaft. The motor 620 drives the pinion 621 which rotates the gear 622 causing the pin 623 to move away from the stop 624. This action winds a clock spring 625 which is shown in section in Figure 30. One end of the clock spring 625 is secured by a screw 720 to the gear 622. The other or inner end of the clock spring 625 is held by a screw pin 721 to a post 722 fastened to the base 700. By reason of the foregoing, the clock spring 625 will turn the gear 622 backwards whenever the motor 620 is deenergized until the pin 623 strikes the stop 624.

When the motor 620 is running, the gear 622 is moved in the direction of the arrow thereon carrying the cam 626 around until it strikes the detent 627. The detent 627 is on the end of a shaft 725 which is slidable in the outer end of a U-shaped supporting bracket 726 and on the other end of which is the switch 628. A collar 727 fastened to the shaft 725 takes the thrust of a spring 728 between the arms of the U-shaped supporting bracket 726 thereby to hold the detent 627 resiliently in the position shown in Figure 30; when the cam 626 finally contacts the detent 627 it moves the shaft 725 upwardly and closes the switch 628 against terminals 730 and 731 connected to the wires 636 and 637 respectively with the consequences that have already been fully described. These terminals 730 and 731 are shown in Figures 30 and 31 as being mounted on a terminal support 732 secured to the base 700. This terminal support may be made of insulating material. The gear 622 is held from axial movement on the shaft 703 by collars 735 and 736, the latter taking the thrust of the spring 728 when the cam 626 operates the detent 627.

The constructions of the various valves whose positions in the hydraulic circuits are indicated in Figure 12 and whose functions have been hereinbefore described are illustrated in Figures 33 to 40 inclusive. These valves are commercial valves, available on the market, and are not per se the subject of my invention. For that reason and also because the drawings, Figures 33 to 40, are quite detailed and readily understood by one skilled in this art, I shall make my description of these valves reasonably brief.

Figure 33 illustrates the solenoid 420 and the valve 421. A solenoid core member, not shown, is connected to operate a valve stem 740 having pistons 741 and 742. The low pressure line 422 is connected to a port 745 while the pipe 423 is connected to a port 747. The exhaust pipe 440 is connected to a channel 748 which connects to a port 750 (the valve has other ports but they are not used). A spring 755 extending between the stem 740 and a cover 756 on the end of the valve casing normally holds the stem 740 and the pistons 741 and 742 to the right as indicated. In this position the port 747 is connected to the port 750 and so therefore the pipe 423 is connected to the exhaust pipe 440. At this time the line 422 is connected to nothing by way of this valve. When, however, the solenoid 420 is energized, the valve stem 740 is shifted to the left and this connects ports 745 and 747 together while disconnecting the exhaust port 750 from the port 747.

Figure 36 illustrates the valve 458. A valve stem 760 has pistons 761 and 762 which are located in a cylinder bore 763 of the valve casing, said cylinder bore 763 having ports 765 and 766. The stem 760 with the pistons 761 and 762 are normally held to the left by a spring 767 between the piston 762 and a cap 770. The pipe 457 is connected to a bore 771 in a cap 772 which covers the end of the cylinder bore 763. Normally the piston 762 blocks the port 766 which is connected to the pipe 459. But when pressure is exerted in the cylinder bore 763 from the pipe 457 against the end of the piston 761, the latter and the piston 762 are shifted to the right to connect the ports 765 and 766, the former being connected to the pipe 460. Thus at that time the pipes 459 and 460 are connected as previously described. When the pressure from the pipe 457 is released, the connection between pipes 459 and 460 is broken. In the cap 770 is a bore 773 connected to a drain pipe 774. This is for the purpose of discharging oil that may leak by the piston 762 into the sump. This pipe 774 is connected to the sump or oil supply tank, not shown, as are all drain pipes hereinafter mentioned.

Figure 37 illustrates the piston-cylinder unit 471 and the switch 472 in the switch box 472a. This construction comprises a valve casing 780 and piston-cylinder casing 781 and the switch box 472a, all connected together as shown. The pipe 470 is connected to a bore 782 through which is a cross bore 783 leading to a bore 784 parallel to the bore 782. The cross bore 783 merges into an enlarged threaded counterbore 785 which is plugged with a screw threaded plug 786. The cross bore 783 further has a counterbore 787 in which is located a sleeve 788 providing a seat for a ball 789 held in closed position by a spring 790 on a pin 791 projecting from the plug 786.

The bore 782 is further intercepted by a bore 792 which merges into a larger bore 793 containing a bored plug 794 having a seat for a ball 795 held in position by a spring 796 on a pin 797 which is on the end of a spindle 798 having a threaded portion 799 in a nut 800 screwed into the casing 780. The larger bore 793 is connected to the bore 784. Adjustment nuts 801 are provided on the threaded portion 799 outside the casing.

The foregoing constitutes two check valves in parallel and opening in oppostie directions. However, the ball 795 will not move away from its seat until the pressure rises to the extremely high figure already referred to, the pressure required to move the ball 795 being adjustable by adjusting the spindle 798. On the other hand, for the purpose of exhausting fluid back into the pipe 470, the ball 789 will move away from its seat under very light pressure.

In the casing 781 is a cylinder bore 805 containing a piston 806. The cylinder bore 805 is connected to a chamber 807 which is connected to the bore 784. A spring 808 normally keeps the piston 806 in the upper position as shown, this spring 808 being mounted on a switch rod 809 and extending between the outside of the box 472a and the piston 806. In the box 472a is the switch 472 on the end of the rod 809. This is a normally open switch but when the fluid passing by the ball 795 enters the chamber 807 and moves the piston 806 downwardly, the rod 809 closes the switch 472 against terminals 810 and 811 respectively connected to the wires 670 and 671. A drain pipe 812 is connected to a bore 813 extending into the cylinder 805.

Figure 38 illustrates the valve 432 and shows this valve in the actuated position connecting the pipes 433 and 462. A valve stem 820 has pistons 821, 822 and 823. The pipe 433 is connected to a port 824 while the pipe 462 is connected to a port 825 and as indicated when the valve stem 820 and the pistons 821, 822 and 823 are actuated to the right, the ports 824 and 825 are connected. The exhaust pipe 434 is connected to a channel 826 which is connected to a port 827. When the parts 820, 821, 822 and 823 are shifted to the left by a spring 828 in the valve cap 829 which spring engages the piston 823, the piston 822 closes the port 825 and connects the port 824 to the port 827.

It will be remembered that the valve 432 is operated by a pilot valve 431 which in turn is operated by a solenoid 430. Neither in this case nor in any other case is the solenoid illustrated in detail since all of such solenoids are or may be purely conventional and the construction thereof is well known. The core of the solenoid 430 is connected to a valve stem 830 of the pilot valve 431 and it is noted that actuation of the solenoid 430 moves the valve stem 830 downwardly and Figure 38 shows valve stem 830 having been moved downwardly. The valve stem 830 has pistons 831 and 832. A port 833 is connected to the pipe 466 while a port 834 is connected to a bore 835. These two ports 833 and 834 are connected when the pilot valve is actuated as shown. Thereby fluid is admitted to the bore 835 which is intersected by a bore 836. In an enlarged portion of the bore 836 is a spring actuated ball check valve 837 connecting the bore 836 to a passage 838 leading to the cylinder 839 in which the pistons 821, 822 and 823 are located. An adjustable needle valve 840 is likewise located in the bore 836 and connects it to a transverse bore 841 also leading into the cylinder 839.

When the parts 830, 831 and 832 are in the actuated position shown in Figure 38, fluid readily passes from the pipe 466 via the port 833, port 834, bore 835, bore 836, valve 837, passage 838 into the cylinder 839 to act upon the valve piston 821 to move it and the other parts to the right as shown thus connecting the pipes 433 and 462. When, however, the solenoid 430 is deenergized, a spring 845 moves the pistons 831 and 832 upwardly, connecting the bore 835 via port 834 to a port 846 which is connected to a drain pipe 848. At the same time the piston 832 blocks the port 833. Fluid can drain from the cylinder 839 through the transverse bore 841 and pass the needle valve 840 into the bore 836 and thence into the bore 835 into the port 834 and the port 846 and out the drain pipe 848, but this draining is controlled by the needle valve 840 whereby to prevent shock to the valve 432 and the system in general.

Figure 39 illustrates the valve 436 which is operated by the pilot valve 451 which is in turn operated by the solenoid 450. The valve 436 is identical with the valve 432 so the valve 436 need not be specifically described, but it is noted that the valve stem 820 and the pistons 821 and 822 and 823 are shown in the left hand or normal position in Figure 39. The same characters of reference are used in Figure 39 for the valve parts as were used in Figure 38 but it is noted that the port 824 is connected to the pipe 435 and the port 825 is connected to the pipe 452 while the passage 826 is connected to the pipe 437.

The pilot valve 451 has all the parts, ports and functions of the pilot valve 431 so again the same reference characters are used and the description need not be repeated. However, a bore 860 is drilled into the port 834 and this bore 860 is connected to the pipe 457. This was a new feature not supplied nor contemplated by the valve manufacturer and is original with me. The port 833 is connected to the pipe 456 while the port 846 is connected to a drain pipe 861. The pilot valve 451 functions, with respect to the valve 436 exactly as the pilot valve 431 functions with respect to the valve 432. However, the pilot valve 451 is also a main solenoid operated valve with respect to the pipes 456 and 457 for when the solenoid 450 is actuated these pipes are connected for direct flow of fluid.

Figure 40 illustrates the main valve 443, the pilot valve 442 operated by the solenoid 441 and the pilot valve 476 operated by the solenoid 475. Each of the pilot valves 442 and 476 is arranged to operate the main valve 443, the pilot valve 442 operating said main valve in one direction and the pilot valve 476 operating said main valve in the other direction. To hold the main valve 443 in the neutral position, a spring centering mechanism is provided which will be presently described.

The pilot valves 442 and 476 are identical with the pilot valve 431 so the same reference characters have been used and the detailed description need not be repeated. In the case of the pilot valve 442, the port 846 is connected to a drain pipe 862 while in the case of the pilot valve 476, the port 846 is connected to a drain pipe 863.

The main valve 443 is itself substantially identical with the main valves 432 and 436. Accordingly, again the same reference characters have been used and the description will not be repeated. It will be seen that the port 824 is connected to the pipe 446, the port 825 is connected to the pipe 444, and the channel 826 is connected to the pipe 478 which is an exhaust pipe leading to the sump. However, in Figure 40 the pistons are marked 821a, 822a and 823a because they are different from the pistons 821, 822 and 823 of Figures 38 and 39 in length and locus and the piston 823a has extending from it a long stem 870. Referring now to Figure 40, the transverse bore 841 and the passage 838 of the pilot valve 476 empty into a cylinder bore 871 which merges into a larger bore 872 both located in a connecting member 873 connecting the casing of the pilot valve 476 with the casing of the valve 443. The bore 872 is continuous with a bore 874 in the casing of the valve 443 and as will be seen, the long stem 870 is mostly located in this bore 872—874.

Located on the long stem 870 are slotted discs with hubs 875 and 876 and extending between them are springs 877 and 878. The disc 876 is held against the springs 877 and 878 by means of a pin 879. When the valve 443 is in the mid position as shown, the disc 876 is against the right hand end of the bore 872 while the disc 875 is against the left hand end of the bore 874. Because the discs 875 and 876 are slotted, pressure fluid from the pilot valve 476 can readily reach the end of the piston 823a to move it and the parts integral with it to the left. Without further description it will readily be seen that when both solenoids 441 and 475 are deenergized, the pistons 821a, 822a and 823a are in the central position shown in Figure 40 in which position all three of the pipes 444, 446 and 478 are blocked. When only the solenoid 441 is energized these three pistons are moved to the right, and when only the solenoid 475 is energized, these pistons are moved to the left. When only the solenoid 441 is energized, the port 827 is blocked which blocks the pipe 478 and at the same time the ports 824 and 825 are connected which connects the pipes 446 and 444. When only the solenoid 475 is energized, the port 825 is blocked which blocks the pipe 444 and at the same time the ports 824 and 827 are connected which connects the pipes 446 and 478.

The valve mechanism 424 consists of check valves 885 and throttle valves 886 connected together as shown in Figure 12. The pipe 423 branches into a pipe 887 leading to a check valve 885 and a pipe 888 leading to the other check valve 885. A pipe 889 connects the right hand check valve 885 to the right hand throttle valve 886 while a pipe 890 connects the left hand check valve 885 to the left hand throttle valve 886. The right hand throttle valve 886 is connected by a pipe 891 to the pipe 425 while the left hand throttle valve 886 is connected by a pipe 892 to the pipe 425. The direction of flow of fluid through the check valves 885 is indicated by arrows in Figure 12. With this arrangement it will be seen that the speed of the charging box 335 can be independently adjusted for the in stroke and the out stroke.

The throttle valves 886 are illustrated in Figure 35 and the throttle valve 461 as well as the needle valve 449 may be of the same construction. Such throttle valves or needle valves have chambers 900 and 901 each connected to piping and separated by a wall 902 having an orifice 903 adapted to be restricted by a conical plug 904 on the end of a spindle 905 having threads 906 and a wheel 907 by the turning of which the valve can be adjusted.

The check valves 885 are illustrated in Figure 34 and the check valve 464 may have the same construction. A channel 910 is connected to piping and a channel 911 at right angles to the channel 910 is likewise connected to piping. A plug 912 is pressed by a spring 913 against a seat 914 at the end of the channel 910. Without further description it will be evident that fluid can flow from the channel 910 to the channel 911 but not vice versa.

The "fluid" used in the system illustrated in Figure 12 should be a liquid since the movement of the various parts and elements operated by this system should be smooth, positive and controlled. Oil of one kind or another is almost universally used for so-called "hydraulic" mechanism today. Naturally, therefore, in putting my invention into use I have used oil.

Figure 2:
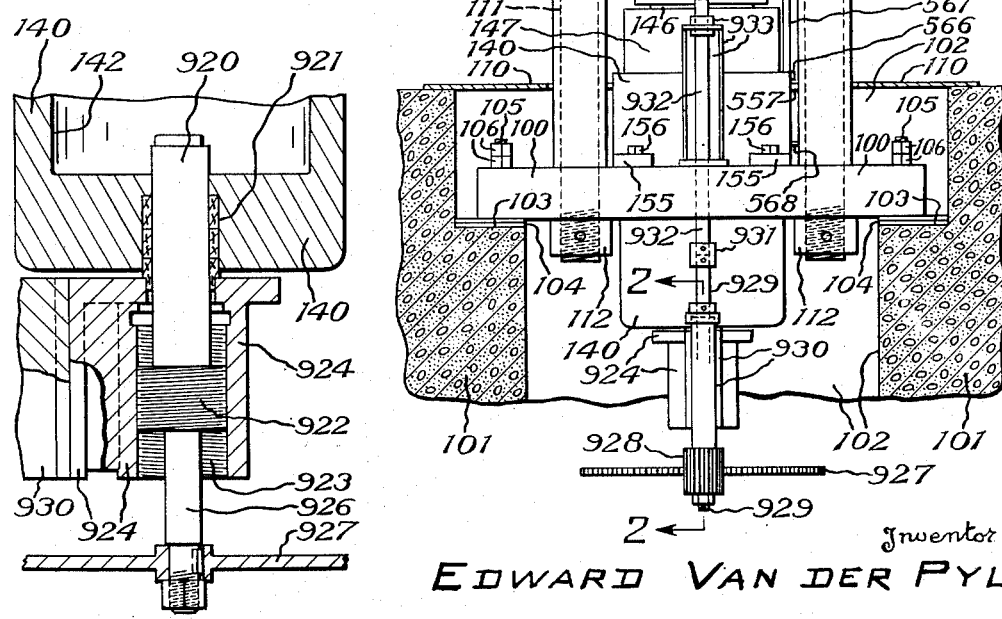
Figure 2 is a fragmentary sectional view of certain adjusting apparatus on an enlarged scale, the section being taken on the line 2—2 of Figure 1.

The lower position of the ram 145 should be adjustable in order that grinding wheels of different thickness may be manufactured. Referring now to Figures 1 and 2, I provide an adjustable cylindrical stop member 920 extending through a stuffing box 921 in the bottom of the cylinder 140. The cylindrical stop member 920 has a screw threaded enlarged diameter portion 922 located in the screw threaded bore 923 of a member 924 which is bolted by bolts (not shown) to the bottom of the cylinder 140. It is evident that by turning the member 920 it can be adjusted vertically in the cylinder 140.

The member 920 further has a downwardly extending integral shaft 926 to the bottom of which is secured a spur gear 927. A pinion gear 928 mounted on the bottom of a shaft 929 meshes with the gear 927. This shaft 929 is journalled in a member 930 attached to the member 924. The shaft 929 is connected by a coupling 931 to a shaft 932 supported by a journalling bracket 933 which is secured to and extends upwardly from the bed plate 100 through which the shaft 932 passes. A square head 935 on top of the shaft 932 will receive a suitable wrench by means of which the pinion gear 928 may be turned thus turning the spur gear 927 thereby vertically to adjust the stop member 920.

Recapitulating the operation, let it be assumed that the press has been stopped with the ram 226 up, the ram 145 up so that the top of the plate 170 is at the level of the top of the mold band 135, and that the charging box 335 is out, that is to say under the registers 331 and 333, and has therefore received a charge of abrasive and bond from the hopper 275. Assuming the pressure lines 422 and 448 are activated, that is to say full of hydraulic fluid under the pressures mentioned, and assuming that the hopper 275 contains an adequate supply of abrasive and bond, the operator may start the automatic molding press in operation by closing the main switches 690 and 691 thus energizing the high voltage power lines 575—576 and the low voltage power lines 577—578. This energizes the electrical circuits and immediately the charging box 335 moves in to a position over the mold band 135. Now the lower ram 145 goes down, there being low pressure above the piston 143 and the bottom of the cylinder 140 being opened to exhaust. This admits a charge of abrasive and bond to the mold, that is to say into the mold band 135 and upon the mold bottom plate 170. The charging box 335 dwells at its in position over the mold on account of the action of the timer 610. That is to say, the charging box 335 does not move out again until the mold bottom plate 170 has reached its lowermost position as determined by the setting of the stop member 920 and may be caused to wait for a short time after the plate 170 has reached its lowermost position in order to allow time for the abrasive bond mixture to break away from the honey comb 390. By dividing the charging box 335 into a number of compartments piling up of some portions and thinning out of other portions of the abrasive bond mixture is avoided and thus all parts of the mold receive approximately equal quantities of charge. This feature minimizes the amount of flow in the mold necessary to produce a body of equal density throughout and therefore assists in achieving equal density throughout.

Finally the changing box 335 moves outwardly and when it has reached its outermost position under the hopper 275 it obtains a fresh charge of abrasive and bond and trips the limit switch 495 which continues the cycle of operation. The upper ram 226 now moves downwardly under low pressure and against the high pressure on the underside of the piston 225, it having been explained that the low pressure prevails over the high by virtue of the difference in areas. This downward movement of the upper ram 226 is a slow controlled movement the rate of which can be controlled by adjusting the valve 449 since downward movement of the piston 225 forces the high pressure fluid back through the line 448 and through the valve 449. So therefore, the top mold plate 235 descends slowly and of course at this time the charging box 335 is well out of the way.

When the top mold plate 235 has barely entered the mold band 135, several valves are shifted and the exact relative position of the ram 226 and mold band 135 when these valves are shifted is adjustable as explained. With the shift of these valves at this moment as already described, the upper end of the cylinder 220 is connected to the upper end of the cylinder 140 and the lower end of the cylinder 140 is connected to low and high pressure in combination. The motivating force for the upper ram 226 is now derived from movement of the lower ram 145 or more specifically its piston 143. The area of the piston 225 is equal to the area of the piston 143 minus the area of the ram 145 (this may not seem to be true in Figure 12, but if these parts are scaled and measured on Figure 12 and the areas computed it will be found to be true within the limits of draftsmanship). Therefore, for every inch or millimeter of upward travel of the ram 145 there will be an inch or millimeter of downward movement of the ram 226. Now the mixture in the mold is being pressed, under low pressure at first, and the mold band 135 is stationary while both the bottom plate 170 and the top plate 235 move together at equal increments, that is to say at the same speed. Thereby the most uniform grinding wheels W are produced that it is possible to produce so far as molding is concerned. I have found that the results are far better than obtained by the conventional presses heretofore in use which presses have only one ram.

Finally the back pressure or reaction of the mix in the mold becomes too great for the low pressure to act further, but at this moment automatically, and without even the shifting of a valve, the high pressure acts and completes the pressing operation. It will be noted that the machine molds to stops, that is to say, the molding is to a definite predetermined volume which produces hundreds of wheels of exactly the same size and since the mold charge is always the same, namely being the capacity of a given sized mold to hold a loose mixture, it is found that all of hundreds of grinding wheels have the same density, grade and structure.

When the posts 264 strike the upper ram head 227, the mold is closed, that is to say it has been stopped, and now the pressure rises to actuate the switch 472 and the next stage of the cycle is initiated. The ram 145 resumes its upward movement under low pressure while the ram 226 moves upwardly under high pressure. The needle valve 449 is adjusted so that the upward speed of the ram 226 will be slightly greater than that of the ram 145 and this may be done because the area of the piston 143 is far greater than the difference in area between the cylinder 220 and the ram 226. Thus, the mold plate 235 moves away from the pressed grinding wheel W and of course if the mold plate 170 should approach the mold plate 235, the newly pressed grinding wheel would be crushed. In some installations it may be advisable to substitute a valve mechanism 424 for the needle valve 449 thus to permit downward movement of the ram 226 to be at one speed and upward movement thereof to be at a faster speed.

The ram 145 is stopped positively when the top of the bottom mold plate 170 is just on a level with the top of the mold band 135 so that the grinding wheel W just pressed can be pushed out of the way by the advancing pusher 395 of the charging box 335 during the next cycle. The ram 226 moves upward to its top position being held there by the constantly maintained high pressure on the underside of the piston 225 until, in the next cycle, the low pressure is again applied to the top of this piston 225. When both rams have reached these upper positions, the cycle automatically repeats. Should the operator at any time want to stop the machine, he should open the switches 690 and 691 just as a fresh grinding wheel W begins to appear.

This press is also capable of molding cup-shaped grinding wheels. The press itself and its main mechanisms do not have to be changed in order to mold cup-shaped wheels, it being sufficient to provide a special mold assembly and a few additional parts and controls such as will now be described.

Referring now to Figure 41, instead of the columns 175 with their extensions 188 I provide column portions 175a which are integral with a plate portion 940 and also integral with extensions just like the extensions 188 which are located in and detachably locked to the lower ram head 160 in the same manner as already described in connection with Figures 6, 8 and 9. Also integral with the column portions 175a is an annular mold bottom plate 170a. This is slidable in a mold band 135.

Located in the annular mold bottom plate 170a is a hollow cylinder 945 which forms the inside of the cup-shaped wheel and as the annular plate 170a moves relatively to this cylinder 945 these two parts have a close sliding fit. Attached to the bottom of the cylinder 945 is a cylinder head 946 through which extends a piston rod 947 having a threaded end 948 screwed into a hollow cylindrical upward extension 949 in the middle of the plate portion 940. On the end of the piston rod 947 and having a close sliding fit in the hollow cylinder 945 is a piston 950. The space between the piston 950 and the cylinder head 946 is connected to a source of air under pressure by way of a flexible hose 951, a pipe section 952, a hand valve 953, a pipe section 954, a reducing valve 955, a pipe section 956, a radial bore 957 in the plate portion 940, a central vertical bore 958 in the plate portion 940, an axial bore 959 in the piston rod 947, and a diametral bore 960 in the poston rod 947. When the press is operating the valve 953 is turned on and since the piston 950 is fixed relative to the ram head 160, the cylinder 945 and its head 946 are urged downwardly relative to the lower ram head 160. However since, during the pressing operation, the ram head 160 moves upwards, carrying the piston 950 upwardly with it, the cylinder 945 is actually held stationary by stop means which will now be pointed out.

In place of the ring 130 I provide a deep ring 130a secured to the mold table 120 which serves to hold the mold band 135 in place and also holds a plurality of stops 963 which are secured to it. A plurality of stops 964 are secured to the edge of the cylinder head 946. Some of these, not shown, may be located in vertical slots 965 provided in the column portions 175a. This stop means establishes the lowermost position of the cylinder 945. I further provide passages 966 and 967 in the cylinder 945 connecting the upper end of the inside of this cylinder with a milled slot 968 which is open to the atmosphere in order to prevent entrapment of air above the piston 950. I also mill a slot 969 in the ring 130a to prevent interference between this ring and the pipe section 956.

The cycle of operation of the press when molding cup-shaped wheels is the same as already described with a few exceptions about to be explained. The cavity inside of the mold bend 135 and around the cylinder 945 is filled as previously described, then the ram 226 descends carrying downwardly the mold top plate 235 to the position shown in Figure 41 and now, the other parts being also in the position shown in Figure 41, the pressing operation takes place. A central hole in the grinding wheel is formed by an arbor 172a which can move into the hole 236. The arbor 172a has a threaded end 180a screwed into a threaded bore in the top of the cylinder 945.

In order to make cup-shaped wheels of uniform grade and structure, I have found it is desirable to press the cylindrical wall of such wheels ahead of the pressing of the bottom, it being understood that these wheels are molded upside down and therefore what will be at the bottom is on top. This is because of the great difference in surface areas of these two portions. Accordingly, I delay the downward movement of the mold top plate 235 after it has reached the position shown in Figure 41 until the annular mold bottom plate 170a has moved upwardly to the first dotted line position during which time the cylinder 945 which forms the inside of the wheel does not move. This is accomplished as shown in Figure 42 by a modification of the wiring and the provision of an additional relay 975 and an additional limit switch 976. The relay 975 controls a normally open switch 977 which is placed in the wire 660 thus holding up energization of the solenoid 450 until the limit switch 976, which is normally open, has been closed. The limit switch 976 is connected by a wire 980 to the + line 577 and to the relay 975 by a wire 981. The other terminal of the relay 975 is connected by a wire 982 to the − line 578. As shown in Figure 41, the limit switch 976 is mounted in a box 976a attached by a bracket 983 to the mold table 120 and the limit switch 976 has an operating plunger 984 on the end of which is a roller 985. A cam bar 986 is adjustably clamped in a slideway holder 987 which is secured to the lower ram head 160 and when the annular mold bottom plate 170a has moved upwardly a sufficient distance, the cam bar 986 engages the roller 985 and closes the switch 976 which operates the solenoid 450 to move the pilot valve 451 thereby operating the valve 436 to connect the pipes 435 and 452 with the consequences already described. Therefore the bottom plate 170a continues its upward motion and at the same time the mold top plate 235 resumes its downward motion until the former has reached the upper dotted line position and the latter has reached the single dotted line position as shown in Figure 41. At the same time this final closing of the mold is accompanied with upward motion of the cylinder 945 because we provide a series of blocks 990, each one being a portion of a ring, resting on and concentrically located upon the plate portion 940, and these blocks 990 contact the cylinder head 946 and positively move it upwardly against the air pressure. When the press is used to make these cup-shaped wheels, I do not rely upon the pusher 395 to remove the pressed wheels from over the mold cavity because a pressed wheel contains the cylinder 945 and the arbor 172a. So therefore, the operator stops the press by opening the circuit to the relay 583 when both rams are up at the end of a cycle. This may be done in many ways, for example by removing the nut 564 (Fig. 28) and operating the rod 561 by hand whenever it is desired to start a new cycle of operation.

Thus for the manufacture of cup-shaped wheels the press may be operated semi-automatically the operation being initiated by operating the rod 561 to close the switch 570 and when a wheel has been molded the press stops with both rams up and the operation picks off the molded wheel. In this particular cycle of operation, when the lower ram 145 is moving upwardly and the upper ram 226 is stationary, fluid exhausts from above the piston 143 by way of the relief valve 479, which is also a safety valve for the system as previously explained.

It will thus be seen that there has been provided by this invention an automatic molding press in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. Molding apparatus comprising a first cylinder, a second cylinder opposed to said first cylinder, a first piston in said first cylinder, a second piston in said second cylinder, a first ram secured to said first piston extending through the end of said first cylinder, a second ram secured to said second piston extending through the end of said second cylinder, said ends of said cylinders facing each other, a first mold plate secured to said first ram, a second mold plate secured to said second ram, a mold band located between said cylinders of a size to receive said mold plates, a source of hydraulic fluid under high pressure, a source of hydraulic fluid under low pressure, a fluid pressure connection to the remote end of the first cylinder, a fluid pressure connection to the remote end of the second cylinder, a fluid pressure connection to the end of the first cylinder toward the second cylinder, a fluid pressure connection to the end of the second cylinder toward the first cylinder, a permanent fluid pressure connection from the source of high pressure to the fluid pressure connection at the end of the first cylinder towards the second cylinder, and further fluid pressure connection valves and operating mechanism therefor arranged automatically to operate to admit low pressure to the end of the second cylinder adjacent the first cylinder and exhaust fluid from the end of the second cylinder remote from the first cylinder, then to admit low pressure to the end of the first cylinder remote from the second cylinder to move the first ram towards the mold band, then to connect the end of the second cylinder adjacent the first cylinder to the end of the first cylinder remote from the second cylinder and to connect the end of the second cylinder remote from the first cylinder to low pressure, then automatically when the reaction force rises to connect the remote end of the second cylinder to high pressure, then to disconnect the connections between the two cylinders and to connect the remote end of the second cylinder to low pressure and the remote end of the first cylinder to exhaust.

2. Molding apparatus comprising an upper cylinder, a lower cylinder opposite and below said upper cylinder, an upper piston in said upper cylinder, a lower piston in said lower cylinder, an upper ram secured to said upper piston and extending through the lower end of said upper cylinder, a lower ram secured to said lower piston and extending through the upper end of said lower cylinder, an upper mold plate secured to said upper ram, a lower mold plate secured to said lower ram, a mold band supported between said cylinders and of a size and shape to receive said mold plates, a source of hydraulic fluid under high pressure, a source of hydraulic fluid under low pressure, a permanent connection between the high pressure source and the lower end of the upper cylinder, valve mechanism to connect the upper end of the upper cylinder to the upper end of the lower cylinder, valve mechanism to connect the upper end of the upper cylinder to the low pressure and alternatively to exhaust, valve mechanism to connect the upper end of the lower cylinder to low pressure and alternatively to exhaust, and valve mechanism to connect the lower end of the lower cylinder to the high and low pressure and alternatively to exhaust.

3. Molding apparatus comprising a cylinder and piston unit, a source of hydraulic fluid under high pressure, a source of hydraulic fluid under lower pressure, valve means to connect said sources to the cylinder, a pipe connecting the valve means to the source under high pressure, a pipe connecting the valve means to the source under lower pressure, a throttle valve in the first named pipe, and a check valve in the second named pipe, whereby the piston and cylinder unit can move fast under low pressure when the resistance is slight but will be moved by the high pressure whenever the resistance becomes high, the change occurring automatically.

4. Molding apparatus comprising an upper ram, a double-acting piston and cylinder unit direct connected to said upper ram, a lower ram axially aligned with and opopsed to said upper ram, a double-acting piston and cylinder unit direct connected to said lower ram, an open and shut valve, a fluid connection from the top of the upper cylinder to one side of said open and shut valve, a fluid connection from the top of the lower cylinder to the other side of the open and shut valve, whereby when said open and shut valve is opened the movement upwardly of said lower ram will cause fluid to be discharged from its cylinder to operate the upper ram.

5. In apparatus as claimed in claim 4, the combination with the parts and features therein specified, of a source of fluid under high pressure, a source of fluid under low pressure, and connections from said sources to the lower end of the cylinder for the lower ram including a check valve in the connection from the low pressure source whereby the lower ram is at first operated rapidly by low pressure and when resistance is met is operated by high pressure.

6. Molding apparatus comprising a first ram, a double-acting piston and cylinder unit connected to said first ram, a second ram axially opposed to said first ram, a piston and cylinder unit connected to said second ram, a source of fluid under pressure, means to connect said source to one end of the cylinder for the first ram to cause said first ram to advance towards the second ram, and a connection including a valve connecting the other end of the cylinder for the first ram to the cylinder for the second ram to cause the second ram to move towards the first ram by fluid exhausted from the cylinder for the first ram.

7. Molding apparatus comprising a cylinder, a piston therein, a mold band, a mold plate connected to said piston, a source of liquid under high pressure, a source of liquid under low pressure, said sources being connected to each other and to said cylinder in Y formation, a throttle valve in the leg of the Y connected to the source under high pressure, a check valve in the leg of the Y connected to the source under low pressure, said check valve allowing liquid to flow from the low pressure source to the cylinder but not vice versa, and a valve in the leg of the Y connected to the cylinder, whereby to move said mold plate comparatively fast under low pressure and automatically to shift to high pressure whenever the resistance of molding reaches a certain peak.

8. Molding apparatus comprising an upper ram head, a lower ram head, said ram heads being aligned, a mold table between said ram heads, a mold band in said mold table, a diametral portion spanning said mold band near the bottom thereof, an arbor secured to and extending upwardly from said diametral portion, a pair of columns secured to said lower ram head and extending either side of said diametral portion, a lower mold plate in said mold band having a hole therein through which said arbor extends and said lower mold plate being secured to said columns, and an upper mold plate secured to said upper ram head and also having a hole therein positioned to receive said arbor, whereby to mold grinding wheels with central holes therein.

9. Molding apparatus comprising a mold band, a mold plate in said mold band, a piston connected to said mold plate, a cylinder in which said piston is located, a source of liquid under relatively high pressure, a source of liquid under relatively low pressure, a connection including a throttle valve from said source under relatively high pressure to said cylinder at the end thereof opposite said mold plate, and a connection including a check valve from said source under relatively low pressure to said cylinder at the end thereof opposite said mold band, said check valve being oriented to permit liquid to flow from the source under relatively low pressure to the cylinder but not vice versa, whereby said mold plate will be moved at relatively high speed until the resistance to molding equals the force exerted by the liquid under relatively low pressure and then said mold plate will continue to be moved by said liquid under relatively high pressure.

10. In molding apparatus as claimed in claim 9, the combination with the parts and features therein specified, of a second mold plate movable into said mold band, a second piston connected to said second mold plate, a second cylinder containing said second piston, and a connection from the cylinder at the end thereof adjacent the mold plate to the second cylinder on the end thereof opposite the second mold plate whereby said second mold plate is moved by force derived from the movement of said piston.

11. Molding apparatus for the manufacture of cup-shaped wheels and the like comprising an upper ram head, a lower ram head, said ram heads being aligned, a mold table between said ram heads, a mold band secured in said mold table, a mold top plate attached to said upper ram head, an annular mold bottom plate connected to said lower ram head to move with it, a central molding member with an imperforate top portion slidably located in said annular mold bottom plate, a pair of abutment means on the lower ram head and on the central molding member and spaced apart for lost motion but eventually operable positively to force upwardly the central molding member, whereby the annular wall of the wheel is first pressed and thereafter all of the wheel is pressed, means for resetting the central molding member relative to the lower ram head responsive to subsequent downward movement of the lower ram head, an arbor on the imperforate top portion of the cylindrical molding member and there being a hole in the mold top plate in which said arbor slidably fits, whereby to mold the wheels with a central hole therein, a cylinder and piston unit for the actuation of said upper ram head, a cylinder and piston unit for actuation of said lower ram head, and hydraulic actuating means and controls for said cylinder and piston units including a control to cause the mold top plate to stop after it enters the mold band, to cause the lower ram head then to move upwardly and later to cause both of said ram heads to move towards each other and then to cause both of them to move upwardly, thereby to mold first the wall of a cup-shaped wheel, thereafter to mold the bottom thereof and finally to eject the wheel from the mold band.

12. Molding apparatus for the manufacture of cup-shaped wheels and the like comprising an upper ram head, a lower ram head, said ram heads being aligned, a mold table between said ram heads, a mold band secured in said mold table, a mold top plate attached to said upper ram head, an annular mold bottom plate connected to said lower ram head to move with it, a central molding member with an imperforate top portion slidably located in said annular mold bottom plate, a pair of abutment means on the lower ram head and on the central molding member and spaced apart for lost motion but eventually operable positively to force upwardly the central molding member, whereby the annular wall of the wheel is first pressed and thereafter all of the wheel is pressed, means for resetting the central molding member relative to the lower ram head responsive to subsequent downward movement of the lower ram head, a cylinder and piston unit for the actuation of said upper ram head, a cylinder and piston unit for actuation of said lower ram head, and hydraulic actuating means and controls for said cylinder and piston units including a control to cause the mold top plate to stop after it enters the mold band, to cause the lower ram head then to move upwardly and later to cause both of said ram heads to move towards each other and then to cause both of them to move upwardly, thereby to mold first the wall of a cup-shaped wheel, thereafter to mold the bottom thereof and finally to eject the wheel from the mold band.

13. Molding apparatus comprising a hopper to contain material to be molded and having a discharge orifice to discharge said material by gravity, a charging box mounted to be moved to a position uder said discharge orifice of said hopper, a mold band, a lower mold plate in said mold band and movable therein, an upper mold plate axially aligned with said first mold plate and movable from a position above said mold band to a position in said mold band, said charging box being also movable to a position to charge the material into said mold band upon said lower mold plate, a pair of hydraulically actuated ram heads each connected to one of the mold plates and each mounted to move the mold plates along the axis of the mold band, hydraulic actuating mechanism and controls to cause the lower mold plate to be moved down in the mold band then to cause the upper mold plate to move downwardly to the top of the mold band, then to cause the mold plates to approach each other, then to cause both mold plates to rise stopping the lower plate on the level of the top of the mold band and raising the upper mold plate well above the mold band, mechanism synchronized to the hydraulic actuating mechanism and controls to cause the charging box to move to the position to charge the material into said mold band and to retreat therefrom while the upper mold plate is above the mold band whereby to fill the mold band with said material, a plurality of posts attached to one ram head and engageable with the other ram head to limit the approach of the mold plates, whereby the charging box fills the mold band with a given volume of material in the unpressed condition and the approach of the mold plates is positively limited so that pressed articles molded by the apparatus have a predetermined volume, a pair of rams one for each ram head, a pair of pistons one connected to each ram, said rams and said pistons being aligned, a pair of opposed cylinders each one containing one of said pistons, thus to provide for hydraulic actuation of the ram heads, and fluid connections from the end of one cylinder nearer the other one to the end of the other cylinder remote from the former whereby the movement of one piston, ram and ram head can be derived from the movement of the other piston.

14. Molding apparatus comprising a hopper to contain material to be molded and having a discharge orifice to discharge said material by gravity, a charging box mounted to be moved to a position under said discharge orifice of said hopper, a mold band, a lower mold plate in said mold band and movable therein, an upper mold plate axially aligned with said first mold plate and movable from a position above said mold band to a position in said mold band, said charging box being also movable to a position to charge the material into said mold band upon said lower mold plate, a pair of hydraulically actuated ram heads each connected to one of the mold plates and each mounted to move the mold plates along the axis of the mold band, hydraulic actuating mechanism and controls to cause the lower mold plate to be moved down in the mold band then to cause the upper mold plate to move downwardly to the top of the mold band, then to cause the mold plates to approach each other, then to cause both mold plates to rise stopping the lower plate on the level of the top of the mold band and raising the upper mold plate well above the mold band, mechanism synchronized to the hydraulic actuating mechanism and controls to cause the charging box to move to the position to charge the material into said mold band and to retreat therefrom while the upper mold plate is above the mold band whereby to fill the mold band with said material, a plurality of posts attached to one ram head and engageable with the other ram head to limit the approach of the mold plates, whereby the charging box fills the mold band with a given volume of material in the unpressed condition and the approach of the mold plates is positively limited so that pressed articles molded by the apparatus have a predetermined volume, a diametral portion across the mold band below the lower mold plate, an arbor centrally located in the mold band secured to and extending upwardly from the diametral portion, and a pair of columns secured to the lower ram head one on either side of said arbor and said diametral portion, the lower mold plate being secured to the said columns, whereby to mold grinding wheels with central holes therein.

EDWARD VAN DER PYL.

REFERENCES CITED

The following references are of record in the file of this patent:

UNITED STATES PATENTS

| Number | Name | Date |
|---|---|---|
| 415,750 | Valle | Nov. 26, 1889 |
| 662,674 | Koch | Nov. 27, 1900 |
| 793,910 | Rouse | July 4, 1905 |
| 794,822 | Then | July 18, 1905 |
| 1,624,904 | Claus | Apr. 12, 1927 |
| 1,648,721 | Claus | Nov. 8, 1927 |
| 1,742,670 | Schmidt | Jan. 7, 1930 |
| 1,765,626 | Stacy | June 24, 1930 |
| 2,100,445 | Le Bleu | Nov. 30, 1937 |
| 2,348,197 | Ernst et al. | May 9, 1944 |
| 2,398,227 | Hubbert | Apr. 9, 1946 |
| 2,409,725 | Whitmore et al. | Oct. 22, 1946 |
| 2,448,277 | Renier | Aug. 31, 1948 |